(12) United States Patent
Itaya et al.

(10) Patent No.: US 9,514,893 B2
(45) Date of Patent: Dec. 6, 2016

(54) ELECTRICAL STORAGE DEVICE AND METHOD FOR MANUFACTURING THE SAME

(71) Applicant: MURATA MANUFACTURING CO., LTD., Nagaokakyo-Shi, Kyoto-fu (JP)

(72) Inventors: Masaharu Itaya, Nagaokakyo (JP); Keiji Horikawa, Nagaokakyo (JP); Manabu Sawada, Nagaokakyo (JP); Hiroyuki Harada, Nagaokakyo (JP); Yuusuke Ueba, Nagaokakyo (JP); Yukio Ehara, Nagaokakyo (JP); Yasuhiko Ueda, Nagaokakyo (JP); Yasutake Fukuda, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 79 days.

(21) Appl. No.: 14/109,305

(22) Filed: Dec. 17, 2013

(65) Prior Publication Data

US 2014/0106191 A1  Apr. 17, 2014

Related U.S. Application Data

(63) Continuation of application No. PCT/JP2012/065981, filed on Jun. 22, 2012.

(30) Foreign Application Priority Data

Jun. 28, 2011  (JP) ................................. 2011-143322

(51) Int. Cl.
*H01M 10/052* (2010.01)
*H01G 11/28* (2013.01)
(Continued)

(52) U.S. Cl.
CPC .............. *H01G 11/28* (2013.01); *H01G 11/12* (2013.01); *H01G 11/20* (2013.01); *H01G 11/72* (2013.01);
(Continued)

(58) Field of Classification Search
CPC .......................... H01M 10/052; H01M 8/0258
See application file for complete search history.

(56) References Cited

U.S. PATENT DOCUMENTS

| | | | |
|---|---|---|---|
| 5,981,107 A * | 11/1999 | Hamano | H01M 4/04 429/129 |
| 6,426,865 B2 | 7/2002 | Kasahara et al. | |
| 7,935,442 B2 | 5/2011 | Kim et al. | |

FOREIGN PATENT DOCUMENTS

| | | |
|---|---|---|
| JP | H06-231796 A | 8/1994 |
| JP | 2001-250742 A | 9/2001 |

(Continued)

OTHER PUBLICATIONS

International Search Report and Written Opinion for PCT/JP2012/065981, mailed Oct. 2, 2012.

(Continued)

*Primary Examiner* — Stewart Fraser
*Assistant Examiner* — Olatunji Godo
(74) *Attorney, Agent, or Firm* — Arent Fox LLP

(57) ABSTRACT

An electrical storage unit that includes a positive electrode, which includes a positive-electrode collector electrode and a positive-electrode active material layer on the positive-electrode collector electrode, a negative electrode, which includes a negative-electrode collector electrode and a negative-electrode active material layer on the negative-electrode collector electrode, the negative-electrode active material layer facing the positive-electrode active material layer, and a first insulating layer bonded to the positive electrode and the negative electrode and separating the positive electrode from the negative electrode. The first insulating layer is bonded to part of a surface of the positive electrode and part of a surface of the negative electrode and includes a communication path for connecting the outside of the electrical storage unit to the inside of the electrical storage unit.

11 Claims, 15 Drawing Sheets

(51) Int. Cl.
| | |
|---|---|
| *H01M 2/36* | (2006.01) |
| *H01M 10/0585* | (2010.01) |
| *H01G 11/12* | (2013.01) |
| *H01G 11/20* | (2013.01) |
| *H01G 11/72* | (2013.01) |
| *H01G 11/80* | (2013.01) |
| *H01G 11/82* | (2013.01) |
| *H01M 2/18* | (2006.01) |
| *H01M 10/0525* | (2010.01) |
| *H01M 2/12* | (2006.01) |
| *H01M 2/16* | (2006.01) |

(52) U.S. Cl.
CPC .............. *H01G 11/80* (2013.01); *H01G 11/82* (2013.01); *H01M 2/1264* (2013.01); *H01M 2/1673* (2013.01); *H01M 2/18* (2013.01); *H01M 2/36* (2013.01); *H01M 10/0525* (2013.01); *H01M 10/0585* (2013.01); *H01M 2/12* (2013.01); *H01M 2/1646* (2013.01); *H01M 2/1653* (2013.01); *Y02E 60/122* (2013.01); *Y02E 60/13* (2013.01); *Y02P 70/54* (2015.11); *Y10T 29/49114* (2015.01)

(56) References Cited

FOREIGN PATENT DOCUMENTS

| | | |
|---|---|---|
| JP | 2002-313679 A | 10/2002 |
| JP | 2003-338435 A | 11/2003 |
| JP | 2005-243303 A | 9/2005 |
| JP | 2007-067155 A | 3/2007 |
| JP | 2007-125821 A | 5/2007 |
| JP | 2008-546135 A | 12/2008 |
| JP | 2012-033907 A | 2/2012 |

OTHER PUBLICATIONS

Japanese Office Action issued for corresponding application JP 2013-522813, date of dispatch Feb. 4, 2014 (English translation attached).

* cited by examiner

FIG. 3
(a)
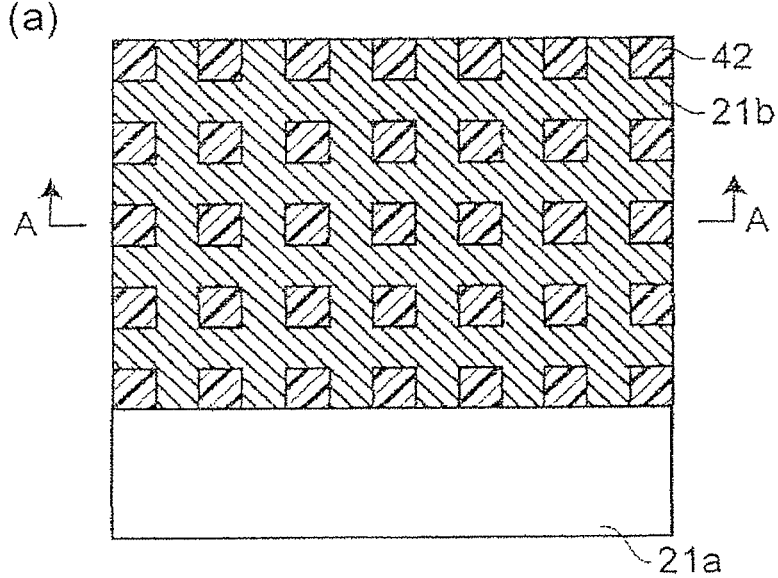
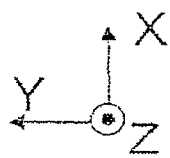
(b)
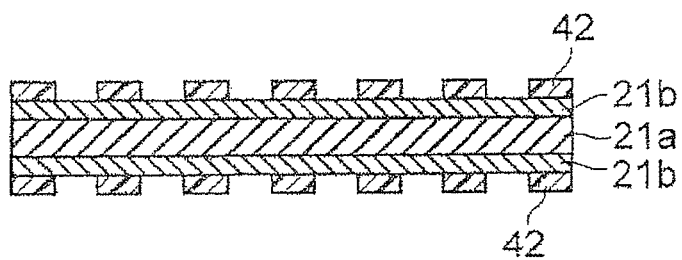
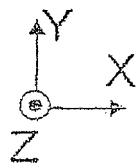

ELECTRICAL STORAGE DEVICE AND METHOD FOR MANUFACTURING THE SAME

CROSS REFERENCE TO RELATED APPLICATIONS

The present application is a continuation of PCT/JP2012/065981 filed Jun. 22, 2012, which claims priority to Japanese Patent Application No. 2011-143322, filed Jun. 28, 2011, the entire contents of each of which are incorporated herein by reference.

FIELD OF THE INVENTION

The present invention relates to electrical storage devices, such as capacitors and batteries, and a method for manufacturing the electrical storage devices.

BACKGROUND OF THE INVENTION

Known electrical storage devices having high energy densities, such as electric double layer capacitors and lithium-ion secondary batteries, are manufactured by the following method.

First, active materials, such as activated carbon, a lithium composite oxide, and carbon, are applied to collector foils formed of metallic foils, such as aluminum foil and copper foil, to form electrode sheets.

Two electrode sheets are arranged such that their active material layers face each other. A separator sheet is placed between the two electrodes in order to prevent a short circuit due to direct contact of the two electrodes. The electrodes and the separator are wound or stacked and form a layered body that includes a plurality of pairs of a positive electrode and a negative electrode.

An aluminum tab or a nickel tab is welded to the positive electrodes and the negative electrodes as an outer electrode, for example, by ultrasonic welding. Thus, electrode groups are obtained.

These electrode groups are placed in an exterior, such as an aluminum can or an aluminum laminate film. After an electrolyte solution is supplied to the exterior, the exterior is sealed to complete a known electrical storage device.

However, it is difficult to further reduce the size and height of electrical storage devices by such known methods.

Patent Document 1 discloses an electric double layer capacitor described in detail below as an electrical storage device that can be further reduced in size and height.

An activated carbon electrode layer is formed on aluminum collector electrodes. The collector electrodes are arranged such that their activated carbon electrode layers face each other. A heat bonding portion that may be formed of modified polypropylene or modified polyethylene and can be melted by heating is provided in advance on the peripheries of the collector electrodes. After a separator is placed between the collector electrodes, an electrolyte solution is supplied between the collector electrodes. The heat bonding portion is heated to seal the collecting electrodes (thermocompression bonding), thereby forming a layered body. A unit cell is formed in such a manner, and an electric double layer capacitor is completed.

The heat bonding portion has a function of maintaining the shape of the layered body and preventing the short circuit between the collector electrodes. Thus, the electrical storage device can be further reduced in size and height.

Patent Document 1: Japanese Unexamined Patent Application Publication No. 2002-313679

In the electric double layer capacitor (electrical storage device) described in Patent Document 1, the peripheries of the collector electrodes are completely sealed. Thus, after the layered body is formed by melting the heat bonding portion, the electrolyte solution cannot be supplied to the layered body.

The electrolyte solution must therefore be supplied between the collector electrodes before heating the heat bonding portion or before forming the layered body. This may cause a problem that the heat during the thermocompression bonding changes the quality of or volatilizes the electrolyte solution.

There are also difficulties in handling because the electrolyte solution may leak and adhere to apparatuses while the electrodes are stacked (the collector electrodes) after the supply of the electrolyte solution and before thermocompression bonding.

Furthermore, since the electrolyte solution is sealed between the collector electrodes of the electrical storage device, a gas generated by the decomposition of water or impurities in the electrolyte solution is not discharged from the layered body. This may cause the expansion of the layered body (between the electrodes), a high impedance (internal resistance) or a low capacity, or separation between the components, for example, between the collector electrodes and the active material layers.

SUMMARY OF THE INVENTION

It is an object of the present invention to provide an electrical storage device that can be reduced in size and height and includes a layered body to which an electrolyte can be supplied after the formation of the layered body and a method for manufacturing the electrical storage device. It is another object of the present invention to provide an electrical storage device that can discharge a gas generated between collector electrodes from the collector electrodes and a method for manufacturing the electrical storage device.

To this end, an electrical storage device according to one aspect of the present invention includes an electrical storage unit and an electrolyte. The electrical storage unit includes a positive electrode, which includes a positive-electrode collector electrode and a positive-electrode active material layer on the positive-electrode collector electrode, a negative electrode, which includes a negative-electrode collector electrode and a negative-electrode active material layer on the negative-electrode collector electrode, the negative-electrode active material layer facing the positive-electrode active material layer, and a first insulating layer bonded to the positive electrode and the negative electrode and separating the positive electrode from the negative electrode. The first insulating layer is bonded to part of a surface of the positive electrode and part of a surface of the negative electrode and includes a communication path for connecting the outside of the electrical storage unit to the inside of the electrical storage unit.

In a collector device according to one aspect of the present invention, the first insulating layer is bonded to part of a surface of the positive electrode and a surface of the negative electrode. Thus, the electrolyte can be easily supplied between the positive electrode and the negative electrode and can come into contact with a wider area of the positive electrode and the negative electrode. Thus, the electrical storage device can be reduced in size and height.

Since the electrolyte can be supplied to the electrical storage unit even after the formation of the layered body, this can prevent degradation or volatilization of the electrolyte caused by heating during thermocompression bonding for stacking.

When an electrical storage device including such an electrical storage unit is energized, a gas generated by the decomposition of water or impurities in the electrolyte can be discharged from the electrical storage unit through a communication path. This can advantageously prevent the expansion of an electrical storage unit, an increase in impedance (internal resistance) or a decrease in capacity, or separation between the electrical storage unit components, for example, between the collector electrodes and the active material layers, caused by gas generation.

In an electrical storage device according to the present invention, the communication path may have a width of 50 µm or more and 100 mm or less.

This allows the electrolyte to be supplied in a shorter time and ensures a high strength of the electrical storage device.

In an electrical storage device according to one aspect of the present invention, the first insulating layer may contain a particulate insulator.

This allows both of the electrodes to be firmly held even in thermocompression bonding or when external stress is applied to the layered body, and thereby prevents a short circuit. The thickness of the first insulating layer, for example, formed by screen printing is proportional to the solid content of the first insulating layer paste. The particulate insulator can increase the solid content of the first insulating layer paste. This allows the first insulating layer to have a large thickness and prevents a short circuit.

An electrical storage device according to one aspect of the present invention may further include a porous second insulating layer surrounded by the positive electrode, the negative electrode, and the first insulating layer. The second insulating layer has lower air permeability than the first insulating layer.

The second insulating layer can more reliably reduce the leakage current in an electrical storage device according to the present invention.

In an electrical storage device according to one aspect of the present invention, the electrical storage unit may include a plurality of the first insulating layers, and the communication path may be formed between the first insulating layers.

This allows the communication path to be more reliably formed and the electrolyte to be more rapidly and reliably supplied between the positive electrode and the negative electrode. Furthermore, a gas generated in the electrical storage unit can be more reliably discharged from the electrical storage unit through the communication path.

A method for manufacturing an electrical storage device that includes an electrical storage unit and an electrolyte, the electrical storage unit including a positive electrode, which includes a positive-electrode collector electrode and a positive-electrode active material layer on the positive-electrode collector electrode, a negative electrode, which includes a negative-electrode collector electrode and a negative-electrode active material layer on the negative-electrode collector electrode, the negative-electrode active material layer facing the positive-electrode active material layer, and a first insulating layer bonded to the positive electrode and the negative electrode and separating the positive electrode from the negative electrode, the method including a step of forming an electrode composite sheet that includes a plurality of the positive-electrode collector electrodes or a plurality of the negative-electrode collector electrodes integrated via the first insulating layer, and a step of bonding the first insulating layer to part of a surface of the positive electrode and part of a surface of the negative electrode and forming a communication path for connecting the outside of the electrical storage unit to the inside of the electrical storage unit.

In an electrical storage device manufactured by this method, the first insulating layer is bonded to part of a surface of the positive electrode and a surface of the negative electrode. Thus, the electrolyte can be easily supplied between the positive electrode and the negative electrode and can come into contact with a wider area of the positive electrode and the negative electrode. Thus, the electrical storage device can be reduced in size and height.

When an electrical storage device manufactured by this method is energized, a gas generated by the decomposition of water or impurities in the electrolyte can be discharged from the electrical storage unit through a communication path. This can advantageously prevent the expansion of an electrical storage unit, an increase in impedance (internal resistance) or a decrease in capacity, or separation between the electrical storage unit components, for example, between the collector electrodes and the active material layers, caused by gas generation.

The step of forming an electrode composite sheet that includes a plurality of collector electrodes including the positive-electrode or negative-electrode active material layer integrated via the first insulating layer can increase productivity as compared with the case where electrodes are individually manufactured and stacked.

Since a plurality of collector electrodes are integrated via the first insulating layer, the collector electrodes even having a reduced thickness can be handled without breakage while the predetermined arrangement and position are maintained. Thus, the electrical storage device can be easily reduced in size and height.

A method for manufacturing an electrical storage device according to the present invention that includes an electrical storage unit and an electrolyte, the electrical storage unit including a positive electrode, which includes a positive-electrode collector electrode and a positive-electrode active material layer on the positive-electrode collector electrode, a negative electrode, which includes a negative-electrode collector electrode and a negative-electrode active material layer on the negative-electrode collector electrode, the negative-electrode active material layer facing the positive-electrode active material layer, and a first insulating layer bonded to the positive electrode and the negative electrode and separating the positive electrode from the negative electrode, the method including a step of bonding the first insulating layer to part of a surface of the positive electrode and part of a surface of the negative electrode and forming a communication path for connecting the outside of the electrical storage unit to the inside of the electrical storage unit, and a step of forming a positive-electrode negative-electrode integrated sheet that includes a plurality of the electrical storage units aligned in at least one direction and dividing adjacent electrical storage units aligned in the at least one direction.

In an electrical storage device manufactured by this method, the first insulating layer is bonded to part of a surface of the positive electrode and a surface of the negative electrode. Thus, the electrolyte can be easily supplied between the positive electrode and the negative electrode and can come into contact with a wider area of the positive electrode and the negative electrode. Thus, the electrical storage device can be reduced in size and height.

When an electrical storage device manufactured by this method is energized, a gas generated by the decomposition of water or impurities in the electrolyte can be discharged from the electrical storage unit through a communication path. This can advantageously prevent the expansion of an electrical storage unit, an increase in impedance (internal resistance) or a decrease in capacity, or separation between the electrical storage unit components, for example, between the collector electrodes and the active material layers, caused by gas generation.

Electrode composite sheets each including a plurality of electrodes integrated via the first insulating layer are stacked to form a positive-electrode negative-electrode integrated sheet. The positive-electrode negative-electrode integrated sheet can be cut into individual electrical storage devices. Thus, the electrical storage devices can be efficiently manufactured.

A method for manufacturing an electrical storage device according to the present invention that includes an electrical storage unit and an electrolyte, the electrical storage unit including a positive electrode, which includes a positive-electrode collector electrode and a positive-electrode active material layer on the positive-electrode collector electrode, a negative electrode, which includes a negative-electrode collector electrode and a negative-electrode active material layer on the negative-electrode collector electrode, the negative-electrode active material layer facing the positive-electrode active material layer, and a first insulating layer bonded to the positive electrode and the negative electrode and separating the positive electrode from the negative electrode, the method including a step of bonding the first insulating layer to part of a surface of the positive electrode and part of a surface of the negative electrode and forming a communication path for connecting the outside of the electrical storage unit to the inside of the electrical storage unit, and a step of supplying an electrolyte to the electrical storage unit through the communication path after the formation of the electrical storage unit.

In an electrical storage device manufactured by this method, the first insulating layer is bonded to part of a surface of the positive electrode and a surface of the negative electrode. Thus, the electrolyte can be easily supplied between the positive electrode and the negative electrode and can come into contact with a wider area of the positive electrode and the negative electrode. Thus, the electrical storage device can be reduced in size and height.

When an electrical storage device manufactured by this method is energized, a gas generated by the decomposition of water or impurities in the electrolyte can be discharged from the electrical storage unit through a communication path. This can advantageously prevent the expansion of an electrical storage unit, an increase in impedance (internal resistance) or a decrease in capacity, or separation between the electrical storage unit components, for example, between the collector electrodes and the active material layers, caused by gas generation.

Since the electrolyte is supplied after the formation of the layered body, degradation or volatilization of the electrolyte caused by heat required for the formation of the layered body can be avoided. Furthermore, since there is no need to handle the electrodes containing the electrolyte while the electrodes are stacked, the process can be simple and efficient.

The electrolyte in the present invention may be, but is not limited to, an electrolyte solution containing a supporting electrolyte, an ionic liquid, or a solid electrolyte, such as a gel electrolyte.

The present invention can provide an electrical storage device that can be reduced in size and height and includes a layered body to which an electrolyte can be supplied after the formation of the layered body and a method for manufacturing the electrical storage device.

The present invention can also provide an electrical storage device that can discharge a gas generated in the layered body, particularly between the electrodes, from the layered body and a method for manufacturing the electrical storage device.

BRIEF DESCRIPTION OF THE DRAWINGS

FIG. 1($b$) is a cross-sectional view of FIG. 1($a$) taken along the line B-B.

FIG. 2($b$) is a cross-sectional view of the positive-electrode active material layer 21$b$ formed on both sides of the positive-electrode collector 21$a$.

FIG. 3($a$) is a plan view of the arrangement of first insulating layers 42.

FIG. 3($b$) is a cross-sectional view of FIG. 3($a$) taken along the line A-A.

FIG. 9(1) is a cross-sectional view of the substrate film 100 and the mold-releasing layer 101 disposed thereon. FIG. 9(2) is a cross-sectional view of a positive-electrode collector film 102 formed on the mold-releasing layer 101. FIG. 9(3) is a cross-sectional view of resist patterns R102 formed on the positive-electrode collector film 102. FIG. 9(4) is a cross-sectional view in which the positive-electrode collector film 102 is etched. FIG. 9(5) is a cross-sectional view in which the resist patterns R102 are removed. FIG. 9(6$a$) is a cross-sectional view in which a positive-electrode active material layer 21$b$ is formed on the positive-electrode collector electrode 21$a$. FIG. 9(6$b$) is a plan view of FIG. 9(6$a$).

FIG. 10(7a) is a cross-sectional view of a separator layer 14 formed on the positive-electrode active material layer 21b. FIG. 10(7b) is a plan view of FIG. 10(7a). FIG. 10(8a) is a plan view of a negative electrode 31 formed on the substrate film.

FIG. 11(8b) is a cross-sectional view of FIG. 10(8a). FIG. 11(9) is a cross-sectional view of a negative-electrode composite sheet 30A. FIG. 11(10) is a cross-sectional view of the positive-electrode composite sheet 20A facing a negative-electrode composite sheet 30A. FIG. 11(11) is a cross-sectional view of the positive-electrode negative-electrode integrated sheet 50A formed by bonding first insulating layers 42 of the positive-electrode composite sheet 20A and first insulating layers 42 of the negative-electrode composite sheet 30A together. FIG. 11(12) is a cross-sectional view in which a substrate film 100 on the positive electrode side is removed from the positive-electrode negative-electrode integrated sheet 50A.

FIG. 12(13) is a cross-sectional view of two positive-electrode negative-electrode integrated sheets 50A facing each other. FIG. 12(14) is a cross-sectional view of layered two positive-electrode negative-electrode integrated sheets. FIG. 12(15) is a cross-sectional view in which one of substrate films 100 is removed. FIG. 12(16) is a cross-sectional view of another positive-electrode negative-electrode integrated sheet 50A disposed over the layered positive-electrode negative-electrode integrated sheets 50A.

DETAILED DESCRIPTION OF THE PREFERRED EMBODIMENTS OF THE INVENTION

Figure 1:
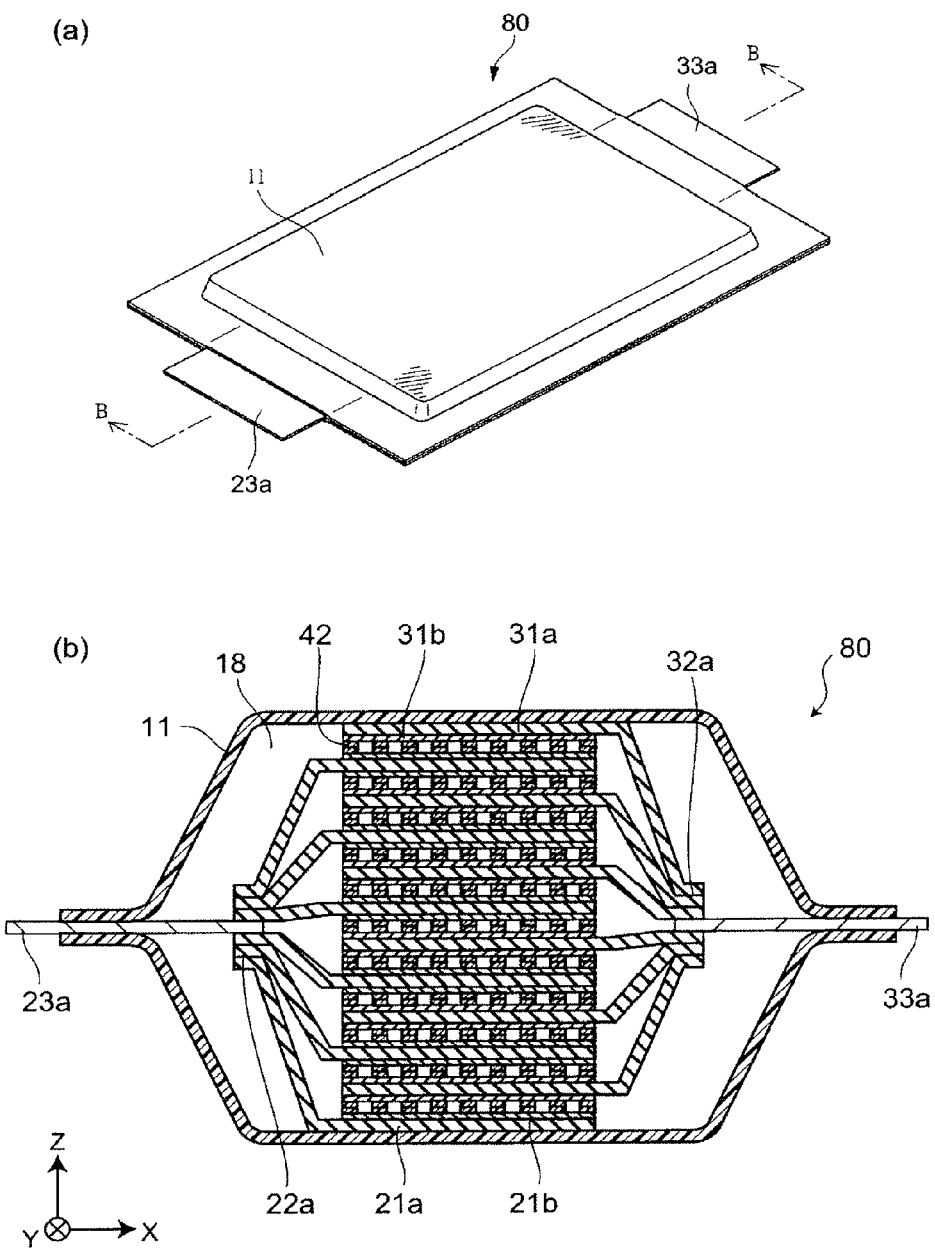
FIG. 1($a$) is a perspective view of an electrical storage device according to a first embodiment of the present invention.

The present invention will be further described in the following embodiments with reference to the drawings. In the following description, although terms that indicate a particular direction or position (for example, "upper", "lower", "right", "left", or another term including these terms) are used if necessary, use of these terms only aims to facilitate the understanding of the present invention with reference to the drawings, and these terms do not limit the technical scope of the present invention.

Like reference numerals designate like parts or members throughout the drawings.

First Embodiment (1) Electrical Storage Device

FIG. 1(a) is a perspective view of the appearance of an electrical storage device according to a first embodiment of the present invention, more specifically an electric double layer capacitor 80. FIG. 1(b) is a cross-sectional view of FIG. 1(a) taken along the line B-B.

The electric double layer capacitor 80 includes a positive-electrode collector electrode 21a on which a positive-electrode active material layer 21b is formed and a negative-electrode collector electrode 31a on which a negative-electrode active material layer 31b is formed. The positive-electrode active material layer 21b faces the negative-electrode active material layer 31b.

First insulating layers 42 are disposed between the positive-electrode active material layer 21b and the negative-electrode active material layer 31b and are bonded to part of a surface of the positive-electrode active material layer 21b and part of a surface of the negative-electrode active material layer 31b. The first insulating layers 42 separate the positive electrode including the positive-electrode collector electrode 21a and the positive-electrode active material layer 21b from the negative electrode including the negative-electrode collector electrode 31a and the negative-electrode active material layer 31b and thereby prevent a short circuit between the positive electrode and the negative electrode.

An electrolyte 18 is disposed between the positive-electrode active material layer 21b and the negative-electrode active material layer 31b.

The "electrical storage unit", as used herein, includes a pair of a positive electrode (a positive-electrode collector electrode 21a and a positive-electrode active material layer 21b) and a negative electrode (a negative-electrode collector electrode 31a and a negative-electrode active material layer 31b) in which the positive-electrode active material layer 21b faces the negative-electrode active material layer 31b, and a first insulating layer 42 disposed between the positive electrode and the negative electrode. The first insulating layer 42 is bonded to part of the positive electrode and part of the negative electrode.

The electric double layer capacitor 80 according to the present embodiment includes a communication path that includes a region surrounded by the positive-electrode active material layer 21b, the negative-electrode active material layer 31b, and the first insulating layers 42. The electrolyte 18 can be supplied to an electrical storage unit through the communication path.

The electric double layer capacitor 80 in FIG. 1 includes a plurality of columnar first insulating layers 42.

FIG. 3(a) is a plan view of the arrangement of the first insulating layers 42 described in detail below with respect to a method for manufacturing the electric double layer capacitor 80. FIG. 3(b) is a cross-sectional view of FIG. 3(a) taken along the line A-A.

Referring to FIGS. 3(a) and 3(b), while a collector lead to be welded (for example, welds 22a and 32a in FIG. 1) remains, the positive-electrode active material layer 21b is formed on a surface of the positive-electrode collector electrode 21a, and the columnar first insulating layers 42 are regularly arranged on the positive-electrode active material layer 21b. The first insulating layers 42 are square when viewed from the top.

In the arrangement of the first insulating layers 42 in FIGS. 3(a) and 3(b), a portion of the positive-electrode active material layer 21b not covered with the first insulating layers 42 is exposed in a grid-like pattern.

Although FIGS. 3(a) and 3(b) illustrate the positive electrode, the negative electrode is similar to the positive electrode, as illustrated in FIG. 1. More specifically, the negative-electrode active material layer 31b is disposed on a surface of the negative-electrode collector electrode 31a, and the first insulating layers 42 are disposed on the negative-electrode active material layer 31b. These first insulating layers 42 face the first insulating layers 42 disposed on the positive-electrode active material layer 21b.

The electrolyte 18 can reach the inside of the electrical storage unit through the gaps between the first insulating layers 42. The gaps between the first insulating layers 42 (also between the positive electrode and the negative electrode) serve as guide paths (communication paths) for the electrolyte 18. The electrolyte 18 can be supplied to the electrical storage unit through the communication paths.

As illustrated in FIG. 1, the gaps between the first insulating layers 42 remain even when a plurality of electrical storage units are stacked. This means that the electrolyte 18 can be supplied to the electrical storage unit even after the electrical storage units are stacked. This can prevent degradation or volatilization of the electrolyte 18 caused by heating while the electrical storage units are stacked by thermocompression bonding.

Hitherto, an insulating layer has been formed on the entire periphery of a positive-electrode collector electrode and the entire periphery of a negative-electrode collector electrode. Thus, an electrolyte solution cannot be supplied to electrical storage units after the electrical storage units are stacked and the insulating layer disposed on the positive-electrode collector electrode and the insulating layer disposed on the negative-electrode collector electrode are integrated into one insulating layer.

Thus, an electrolyte solution must be supplied to the electrical storage units before the electrical storage units are stacked.

In the electric double layer capacitor 80, however, it is not necessary to supply the electrolyte 18 to the electrical storage units before the electrical storage units are stacked, as described above. Thus, there is no need to handle the electrical storage units containing the electrolyte 18 while the electrical storage units are stacked. Thus, the process can be simple and efficient.

Furthermore, the presence of such communication paths decreases the time for the electrolyte 18 to reach the inside of the electrical storage units and advantageously facilitates the supply of the electrolyte 18.

The communication paths preferably have a width of 50 μm or more. This is because the electrolyte 18 can be supplied in a shorter time. The communication paths preferably have a width of 100 mm or less. This more reliably ensures a high strength of the electrical storage device.

In the manufacture of the electric double layer capacitor 80, it is not necessary to supply the electrolyte 18 to the electrical storage units after the electrical storage units are stacked. The electrolyte 18 may be supplied before the electrical storage units are stacked and/or while the electrical storage units are stacked. The electrolyte 18 may be additionally supplied after the electrical storage units are stacked.

The arrangement of the first insulating layers 42 is not limited to the arrangement illustrated in FIG. 1 and FIGS. 3(a) and 3(b). The first insulating layers 42 may be arranged in any way, provided that gaps serving as communication paths for supplying the electrolyte to the electrical storage units can be formed between the positive electrode (the positive-electrode active material layer 21b) and the negative electrode (the negative-electrode active material layer 31b).

FIGS. 5(a) to 5(d) are plan views of the arrangements of the first insulating layer(s) 42. FIGS. 5(a) to 5(d) illustrate the first insulating layer(s) 42 disposed on at least one of the positive-electrode collector electrode 21a and the positive-electrode active material layer 21b. It goes without saying that the first insulating layer(s) 42 may be correspondingly disposed on at least one of the negative-electrode collector electrode 31a and the negative-electrode active material layer 31b of the negative electrode.

Figure 5:
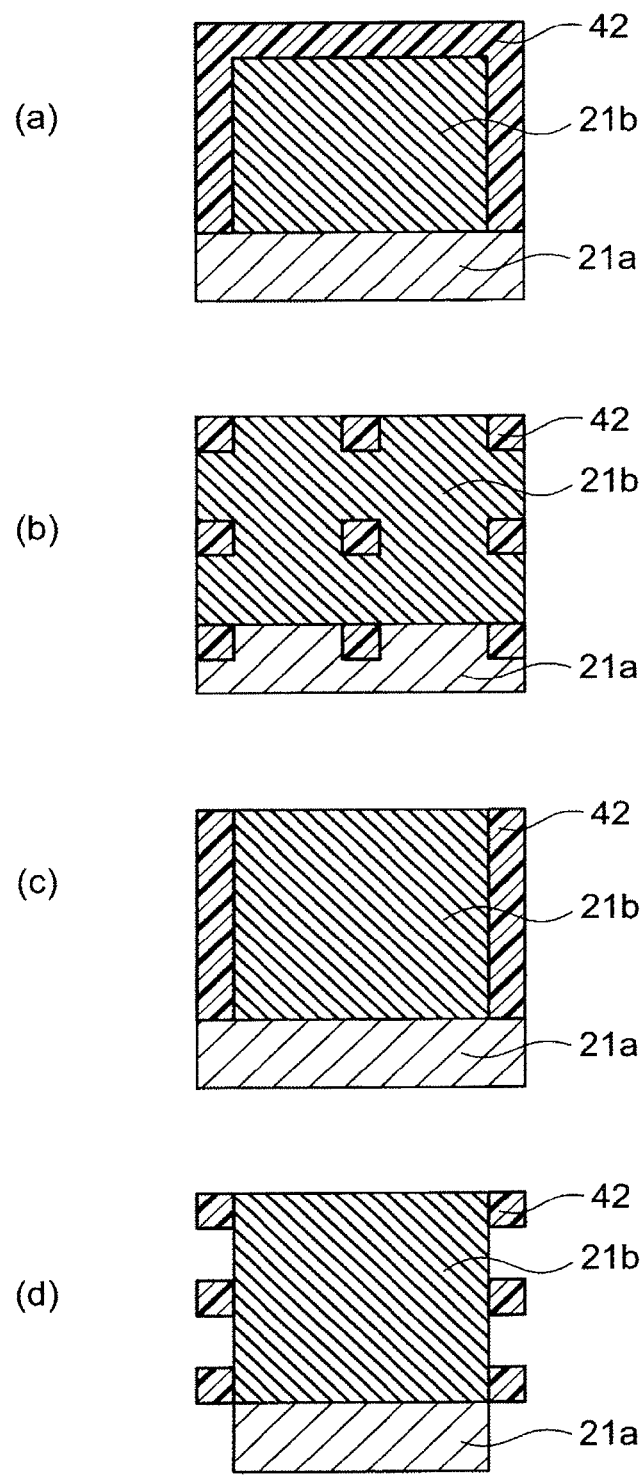
FIGS. 5($a$) to 5($d$) are plan views of the arrangements of the first insulating layer(s) 42.

In the embodiment illustrated in FIG. 5(a), the first insulating layer 42 has a U shape when viewed from the top. The first insulating layer 42 is disposed on three of four sides of the positive-electrode active material layer 21b.

In the embodiment illustrated in FIG. 5(a), the first insulating layer 42 is not formed on one side of the positive-electrode active material layer 21b, and this side serves as a communication path.

In the embodiment illustrated in FIG. 5(b), a plurality of columnar first insulating layers 42 are arranged in the same manner as in FIGS. 3(a) and 3(b). In the embodiment illustrated in FIG. 5(b), the first insulating layers 42 are disposed on a portion of the positive-electrode collector electrode 21a on which the positive-electrode active material layer 21b is not formed, as well as on the positive-electrode active material layer 21b.

When the first insulating layers 42 are disposed on a portion of the positive-electrode collector electrode 21a on which the positive-electrode active material layer 21b is not formed, preferably, the first insulating layers 42 are not formed on the welds 22a and 32a, which are formed by welding the positive-electrode collector electrode 21a to the positive-electrode collector electrode 21a of another electrical storage unit.

In the embodiment illustrated in FIG. 5(c), two first insulating layers 42 are disposed on two of four sides of the positive-electrode active material layer 21b.

In the embodiment illustrated in FIG. 5(c), the first insulating layers 42 are not formed on two sides of the positive-electrode active material layer 21b, and these sides serve as a communication path.

In FIG. 5(d), columnar first insulating layers 42 are arranged. In the embodiment illustrated in FIG. 5(d), the first insulating layers 42 are not bonded to a main surface of the positive-electrode active material layer 21b but to side surfaces of the positive-electrode collector electrode 21a and the positive-electrode active material layer 21b.

The first insulating layers 42 illustrated in FIG. 5(d) form gaps between the columnar first insulating layers 42 and between the positive-electrode active material layer 21b and the negative-electrode active material 31b. These gaps serve as communication paths.

As illustrated in FIG. 5(d), when the first insulating layers 42 are arranged in the vicinity of the periphery of at least one of the positive-electrode collector electrode 21a, the positive-electrode active material layer 21b, the negative-electrode collector electrode 31a, and the negative-electrode active material layer 31b, the first insulating layers 42 may be arranged on a side surface or a main surface of the positive-electrode collector electrode 21a, the positive-electrode active material layer 21b, the negative-electrode collector electrode 31a, or the negative-electrode active material layer 31b.

Figure 6:
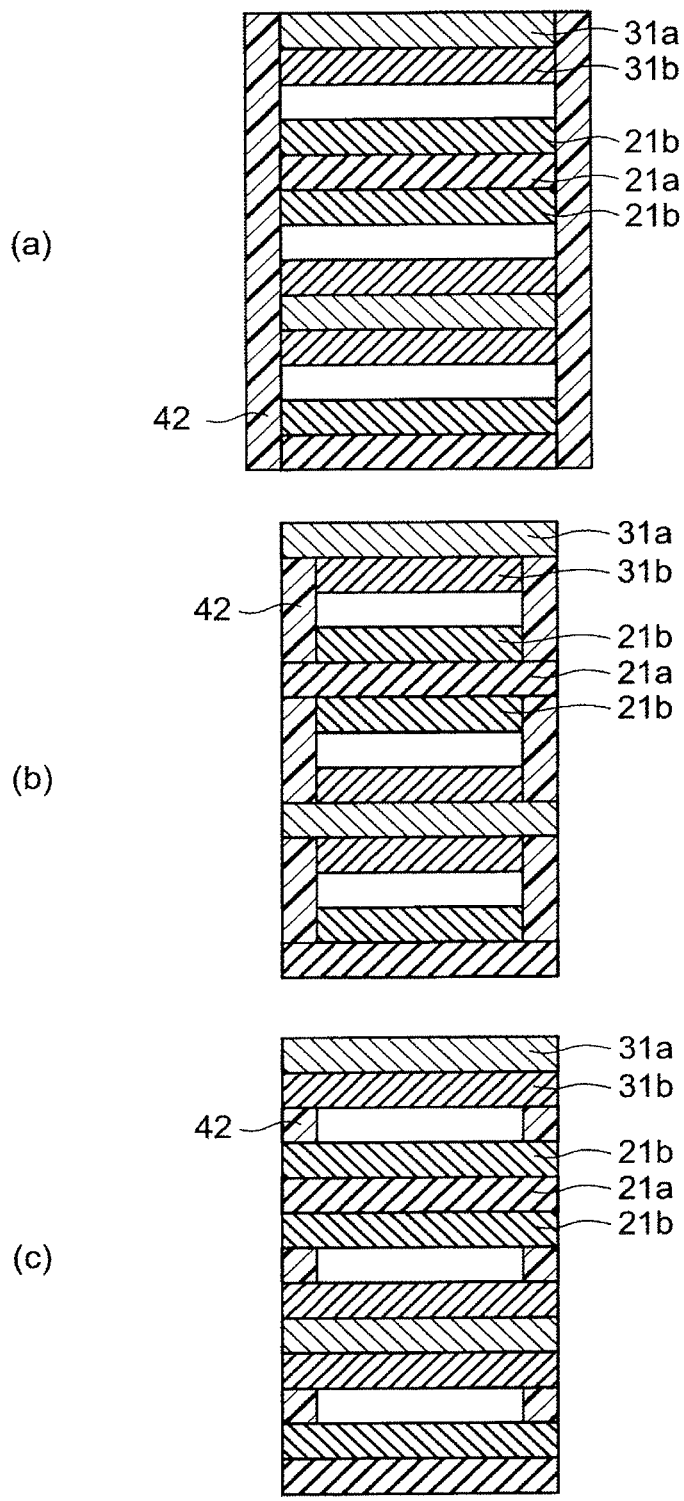
FIGS. 6($a$) to 6($c$) are cross-sectional views of the first insulating layers 42 disposed on the periphery of at least one of a positive-electrode collector electrode 21$a$, the positive-electrode active material layer 21$b$, a negative-electrode collector electrode 31$a$, and a negative-electrode active material layer 31$b$ and layered electrical storage units.

FIGS. 6(a) to 6(c) are cross-sectional views of the first insulating layers 42 disposed on the periphery of at least one of a positive-electrode collector electrode 21a, the positive-electrode active material layer 21b, a negative-electrode collector electrode 31a, and a negative-electrode active material layer 31b and layered electrical storage units. The collector electrodes are electrically connected to the outside of the electrical storage device through a tab, such as a positive electrode tab 23a or a negative electrode tab 33a illustrated in FIG. 1, as described in detail below. In FIG. 6, the connectors are perpendicular to the drawing and are not shown in these cross-sectional views.

In the embodiment illustrated in FIG. 6(a), the first insulating layers 42 are bonded to side surfaces of the positive-electrode collector electrode 21a, the positive-electrode active material layer 21b, the negative-electrode collector electrode 31a, and the negative-electrode active material layer 31b.

Thus, the first insulating layers 42 are continuously disposed on the stacked electrical storage units.

In the embodiment illustrated in FIG. 6(b), the first insulating layers 42 are bonded to main surfaces of the positive-electrode collector electrode 21a and the negative-electrode collector electrode 31a and side surfaces of the positive-electrode active material layer 21b and the negative-electrode active material layer 31b.

In the embodiment illustrated in FIG. 6(c), the first insulating layers 42 are bonded to main surfaces of the positive-electrode active material layer 21b and the negative-electrode active material layer 31b.

In the embodiments illustrated in FIGS. 6(b) and 6(c), the first insulating layers 42 are disposed within a single electrical storage unit and are not continuously disposed on a plurality of electrical storage units.

In any of FIGS. 6(a) to 6(c), the first insulating layers 42 can form gaps serving as communication paths between the first insulating layers 42 and between the positive-electrode active material layer 21b and the negative-electrode active material layer 31b.

As described above with reference to FIG. 1, in the electric double layer capacitor 80 according to the present embodiment, the positive electrode (particularly the positive-electrode active material layer 21b) and the negative electrode (particularly the negative-electrode active material layer 31b) are partly covered with the first insulating layers 42. This obviates the necessity of placing a porous insulating layer (separator) between the electrodes. Since only the electrolyte 18 is disposed between considerable surface areas of the positive-electrode active material layer 21b and the negative-electrode active material layer 31b, this advantageously results in low resistance between the positive-electrode active material layer 21b and the negative-electrode active material layer 31b.

Furthermore, since no porous insulating layer (separator) is formed between the electrodes by coating, only the first insulating layer can be formed to manufacture the device. This can reduce the number of components and processing costs of the electrical storage device.

A porous second insulating layer (separator) may be disposed between the electrodes. The separator can reduce the occurrence of short circuits due to detachment of the active material from the positive-electrode active material layer 21b and the negative-electrode active material layer 31b, increase the yield of the device, or reduce leakage current.

In order to reduce the resistance of the electrical storage device, the separator layer effectively forms many voids and reduces resistance between the electrodes. In the case of a separator containing a particulate material and a resin component, in order to form a low-resistance separator layer, the resin component must be reduced in quantity so as not to fill the voids.

In order to bond the electrodes together with the resin component of the separator layer to form an electrical storage unit, the resin component of the separator layer requires good adhesion. Thus, the resin component of the separator layer must be increased to improve adhesion.

The amount of resin component must be decreased to achieve low resistance and must be increased to improve adhesion. Because of this contradiction in terms of the amount of resin component, it is difficult to manufacture a separator having low resistance and good adhesion.

In accordance with the present embodiment, the first insulating layers 42 having good adhesion for maintaining the shape of the electrical storage unit and the low-resistance porous second insulating layer (separator) having a low resin content can be formed and arranged in a manner that depends on their "different functions". Such a structure can achieve lower resistance than structures in which an "adhesive separator layer" having a high resin content is disposed between the electrodes (because the adhesive separator layer has high resistance due to its high resin content).

The second insulating layer may have good adhesion. The second insulating layer having good adhesion can strengthen the bonding between the electrodes.

The second insulating layer (separator) needs to retain an electrolyte and ensure high ionic conductivity between the positive electrode and the negative electrode of the electrical storage unit. Thus, the second insulating layer (separator) has lower air permeability than the first insulating layers 42. This means that the second insulating layer has higher liquid permeability than the first insulating layers 42.

Air permeability can be measured with a digital Oken-type air permeability tester (for example, "EG01-5-1MR" manufactured by Asahi Seiko Co., Ltd.) using a method according to Japanese Industrial Standards (JIS) P8117 at a cylinder pressure of 0.25 MPa, a measuring pressure of 0.05 MPa, and a measuring inner diameter of 30 mm.

The first insulating layers 42 preferably have an air permeability of 1250 s/100 cc or more in order to ensure sufficient adhesion and firmly maintain the shape of the electrical storage unit.

The second insulating layer preferably has many voids to lower the resistance between the electrodes and preferably has an air permeability of more than 0 s/100 cc and 1000 s/100 cc or less.

The electric double layer capacitor 80 includes many stacked electrical storage units to store a large amount of electricity. In order to store as much electricity as possible at a minimum volume, the positive-electrode active material layer 21b and the negative-electrode active material layer 31b are preferably formed on both sides of each of the positive-electrode collector electrodes 21a and the negative-electrode collector electrodes 31a, as illustrated in FIG. 1. However, the positive-electrode active material layer 21b and the negative-electrode active material layer 31b are preferably formed on one side of the outermost positive-electrode collector electrode 21a and the outermost negative-electrode collector electrode 31a in the height direction (the Z direction in FIG. 1) (the top negative-electrode collector electrode 31a and the bottom positive-electrode collector electrode 21a in FIG. 1). The capacitance per volume of the electrical storage device can be increased by eliminating an active material layer that does not face its counter electrode and makes a negligible contribution to the capacitance of the electrical storage device.

A plurality of electrical storage units (11 units in FIG. 1) are stacked. End portions of the positive-electrode collector electrodes 21a of the electrical storage units are welded together and form the weld 22a. The weld 22a is electrically connected to the positive electrode tab 23a. Likewise, end portions of the negative-electrode collector electrodes 31a of the electrical storage units are welded together and form the weld 32a. The weld 32a is electrically connected to the negative electrode tab 33a.

The stacked electrical storage units are housed in a package 11. The electrolyte 18 introduced into the package is supplied to the electrical storage units through the communication paths.

The positive electrode tab 23a and the negative electrode tab 33a protrude from the package 11. The electrical storage units are electrically connected to the outside of the package through the positive electrode tab 23a and the negative electrode tab 33a.

Since the electrical storage units of the electrical storage device (electric double layer capacitor) 80 are housed in the package 11, the electrolyte 18 is prevented from volatilizing.

When the electric double layer capacitor 80 is energized, a gas generated by the decomposition of water or impurities in the electrolyte 18 can be discharged from the electrical storage units through the communication paths. This can advantageously prevent the expansion of the electrical storage units, an increase in impedance (internal resistance) or a decrease in capacity, or separation between the electrical storage unit components, for example, between the collector electrodes and the active material layers, caused by gas generation.

An electric double layer capacitor according to an embodiment of the present invention is not limited to the form of stacked electrical storage units as illustrated in FIGS. 1(a) and 1(b). For example, electric double layer capacitors (electrical storage devices) that include no stacked electrical storage units are also within the scope of the present invention. For example, an electric double layer capacitor (electrical storage device) includes one positive electrode including a positive-electrode active material layer 21b on one side of a positive-electrode collector electrode 21a and one negative electrode including a negative-electrode active material layer 31b on one side of a negative-electrode collector electrode 31a.

The components of the electric double layer capacitor 80 will be described in detail below.

Positive-Electrode Collector Electrode, Negative-Electrode Collector Electrode, Positive-Electrode Active Material Layer, and Negative-Electrode Active Material Layer Although the electric double layer capacitor 80 is exemplified as an electrical storage device according to the present invention, the present invention is not limited to the electric double layer capacitor 80. For example, the present invention encompasses various devices having an electrical storage function, including lithium-ion secondary batteries and lithium-ion capacitors.

An electric double layer capacitor according to one embodiment includes a positive-electrode collector electrode 21a and a negative-electrode collector electrode 31a formed of aluminum foil and a positive-electrode active material layer 21b and a negative-electrode active material layer 31b formed of activated carbon.

The electric double layer capacitor contains 1 mol/L triethylmethylammonium tetrafluoroborate dissolved in propylene carbonate as the electrolyte 18.

A lithium-ion secondary battery according to one embodiment includes a positive-electrode collector electrode 21a formed of aluminum foil and a positive-electrode active material layer 21b formed of a mixture layer containing a lithium composite oxide, such as $LiCoO_2$, in the positive electrode and a negative-electrode collector electrode 31a formed of copper foil and a negative-electrode active material layer 31b formed of a mixture layer containing graphite in the negative electrode. The lithium-ion secondary battery contains 1 mol/L $LiPF_6$ dissolved in a mixed solvent of ethylene carbonate (30% by volume) and diethyl carbonate (70% by volume) as the electrolyte 18.

A lithium-ion capacitor according to one embodiment includes a positive-electrode collector electrode 21a formed of aluminum foil and a positive-electrode active material layer 21b formed of a mixture layer containing activated carbon in the positive electrode and a negative-electrode collector electrode 31a formed of copper foil and a negative-electrode active material layer 31b formed of a mixture layer containing graphite in the negative electrode. The negative electrode is pre-doped with lithium ions.

The lithium-ion capacitor contains 1 mol/L $LiPF_6$ dissolved in a mixed solvent of ethylene carbonate (30% by volume) and diethyl carbonate (70% by volume) as the electrolyte 18.

First Insulating Layer

The first insulating layers 42 may be formed of a thermoplastic resin (such as poly(vinylidene fluoride) (PVDF), a PVDF-hexafluoropropylene copolymer, or poly(ethylene oxide)) or a thermosetting resin, such as polyimide, polyamideimide, or polyamide.

In particular, thermoplastic resins are preferred because thermoplastic resins become soft when heated to the glass transition temperature or melting point thereof. More specifically, thermoplastic resins heated or press-bonded under heating have a larger contact area with an adherend, that is, the positive-electrode active material layer 21b, the negative-electrode active material layer 31b, the positive-electrode collector electrode 21a, or the negative-electrode collector electrode 31a, or a separator layer (if used) and have a high adhesive strength (bonding strength).

A thermoplastic resin PVDF has high heat resistance and solvent resistance.

Thermosetting resins have high heat resistance, bond strength, and chemical stability. Thermosetting resins have higher strength than thermoplastic resins and improve the strength of a layered body.

A method for bonding the first insulating layers 42 to the adherend includes press-bonding or heating of electrodes having the first insulating layers 42. The first insulating layers 42 are bonded to and integrated with the adherend (such as the positive electrode or the negative electrode) by press-bonding or heating. Press-bonding under heating can strengthen the bonding.

When electrodes having the first insulating layers 42 are stacked to prepare a layered body, a temporary layered body is formed by temporary bonding, for example, by heating, and is then completely bonded, for example, by heating.

This allows positive electrodes and negative electrodes to be successively stacked with high accuracy.

The complete bonding may be performed on a temporary bonded multilayer assembly of a plurality of layered bodies. Alternatively, after a temporary bonded multilayer assembly is diced, each layered body may be completely bonded.

The first insulating layers 42 may contain a particulate insulator. The particulate insulator can increase the strength of the first insulating layers 42, prevent the crushing of the first insulating layers 42, and prevent a short circuit between the electrodes.

Electrolyte

The electrolyte 18 is necessary to operate the electrical storage device.

For lithium-ion secondary batteries, the electrolyte 18 may be a common electrolyte for lithium-ion secondary batteries. For lithium-ion capacitors, the electrolyte 18 may be a common electrolyte for lithium-ion capacitors. For electric double layer capacitors, the electrolyte 18 may be a common electrolyte for electric double layer capacitors.

The electrolyte 18 may be an electrolyte generally used in electrical storage devices, for example, an electrolyte solution of a Li salt, such as $LiPF_6$, $LiBF_4$, or LiTFSI, dissolved in an organic solvent selected from dimethyl carbonate, diethyl carbonate, methylethyl carbonate, propylene carbonate, and acetonitrile, or a mixture thereof, or an electrolyte solution of tetramethylammonium tetrafluoroborate, triethylmethylammonium tetrafluoroborate, 1-ethyl-3-methylimidazolium tetrafluoroborate, or 1-ethyl-3methylimidazolium bis(trifluoromethanesulfonyl)imide dissolved in the organic solvent.

In electric double layer capacitors, when the electrolyte is an ionic liquid, such as 1-ethyl-3-methylimidazolium tetrafluoroborate or 1-ethyl-3methylimidazolium bis(trifluoromethanesulfonyl)imide, the electrolyte may be an ionic liquid substantially free of organic solvents. An ionic liquid substantially free of organic solvents has a low vapor pressure even at high temperatures and can therefore reduce expansion at high temperatures. Thus, the electrical storage device can have high heat resistance. An electric double layer capacitor using 1-ethyl-3-methylimidazolium tetrafluoroborate has lower resistance than an electric double layer capacitor using 1-ethyl-3methylimidazolium bis(trifluoromethanesulfonyl)imide because 1-ethyl-3-methylimidazolium tetrafluoroborate has higher electric conductivity due to the smaller ionic radius of the tetrafluoroborate anion.

Package

The package 11 may be formed of a film. The film may be any film that is insulated on the inside (on the surface facing the layered body) and can retain the electrolyte 18.

One preferred film is an aluminum laminate film that is lined with polypropylene on the inside and nylon on the outside.

Second Insulating Layer (Separator)

The porous second insulating layer (separator) may be formed of a resin generally used in electrical storage devices. The resin may be at least one material selected from the group consisting of polyethylene, polypropylene, polytetrafluoroethylene (PTFE), poly(vinylidene fluoride), poly(ethylene oxide), poly(vinyl acetate), poly(vinyl alcohol), styrene-butadiene rubber, and carboxymethylcellulose.

The second insulating layer more preferably contains a particulate insulator. The particulate insulator can reduce the contraction of the second insulating layer or filling of pores even when the second insulating layer is pressed in a stacking process. Thus, the particulate insulator can more efficiently insulate the positive electrode from the negative electrode. Thus, the electrical storage device can have low resistance.

The particulate insulator may be particles of an organic substance, such as PTFE, an inorganic filler, such as silica or alumina, or a mixture thereof. An inorganic filler is preferred because the inorganic filler can provide the second insulating layer with heat resistance to surface mounting and efficiently maintain the porosity during thermocompression bonding of the layered body because of its high hardness. More preferably, three-dimensionally amorphous insulating particles, such as crushed silica, are used to form more voids between particles, ensure an ion conducting path, and reduce the resistance of the electrical storage device.

The second insulating layer is formed by applying a slurry containing the components of the second insulating layer to the positive electrode and the negative electrode, or the positive electrode, or the negative electrode. The second insulating layer may be applied with a comma coater, with a die coater, or by gravure printing, preferably by screen printing.

(2) Manufacturing Method

A method for manufacturing the electric double layer capacitor 80 will be described below as a method for manufacturing an electrical storage device according to the present embodiment.

Figure 2:
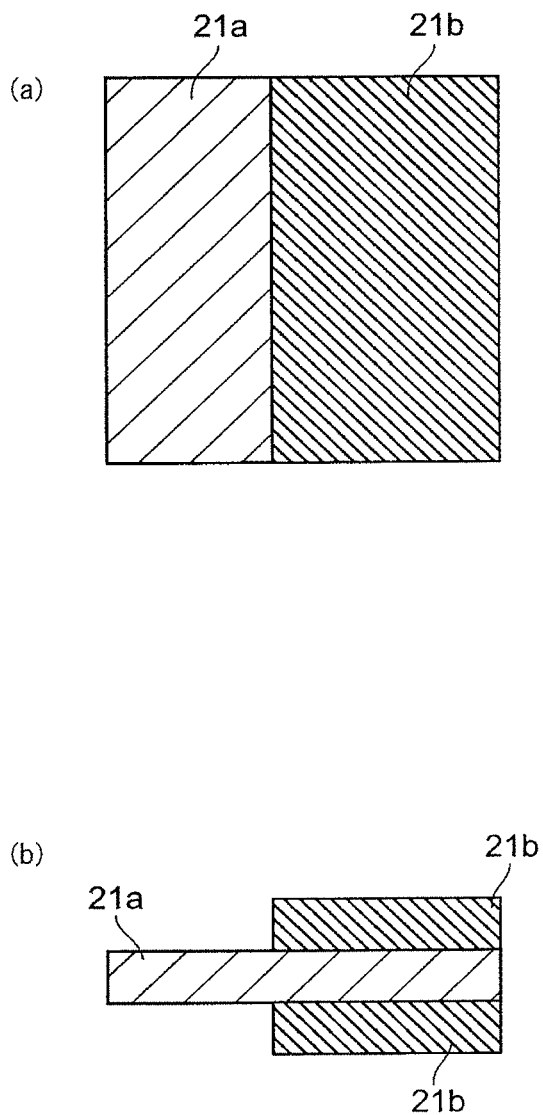
FIG. 2($a$) is a plan view of a positive-electrode active material layer 21$b$ formed on both sides of a positive-electrode collector 21$a$.

FIG. 2(*a*) is a plan view of a positive-electrode active material layer 21*b* formed on both sides of a positive-electrode collector electrode 21*a*. FIG. 2(*b*) is a cross-sectional view of the positive-electrode active material layer 21*b* formed on both sides of the positive-electrode collector electrode 21*a*.

A material for the positive-electrode active material layer 21*b*, such as a paste containing activated carbon, described in detail above is applied, for example, by screen printing to both sides of the positive-electrode collector electrode 21*a* (one side of the bottom positive-electrode collector electrode 21*a*) made of aluminum foil described in detail above. The material is dried to form the positive-electrode active material layer 21*b* on both sides of the positive-electrode collector electrode 21*a*.

In general, as illustrated in FIGS. 2(*a*) and 2(*b*), a portion of the positive-electrode collector electrode 21*a* is not covered with the positive-electrode active material layer 21*b* to provide a lead to become the weld 22*a*.

The negative-electrode active material layer 31*b* can be formed on both sides of the negative-electrode collector electrode 31*a* (one side of the top negative-electrode collector electrode 31*a*) using the same method.

The positive electrode and the negative electrode can be formed in this manner.

A binder solution is prepared by dissolving a desired resin selected from the thermoplastic resins and the thermosetting resins described above in a solvent, such as N-methylpyrrolidone (NMP).

The binder solution may contain a particulate insulator if necessary.

The binder solution is mixed in a pot rack to prepare a slurry (first insulating layer paste). The slurry is applied to the positive-electrode active material layer 21*b* and/or the positive-electrode collector electrode 21*a* to form the first insulating layers 42 in a desired pattern as illustrated in FIG. 3.

Likewise, the slurry (first insulating layer paste) is applied to the negative-electrode active material layer 31*b* and/or the negative-electrode collector electrode 31*a* to form the first insulating layers 42 in a desired pattern.

In the electric double layer capacitor 80, the first insulating layers 42 are formed on both the positive electrode and the negative electrode. The first insulating layers 42 on the positive electrode and the first insulating layers 42 on the negative electrode are integrated into the first insulating layers 42 in a stacking process. The integrated first insulating layers 42 are bonded to the positive electrode and the negative electrode.

Alternatively, the first insulating layers 42 may be formed on one of the positive electrode and the negative electrode and may be bonded to the positive electrode and the negative electrode.

A required number of the positive electrodes and the negative electrodes on which the first insulating layers 42 have been formed are prepared.

If necessary, the positive electrodes and the negative electrodes thus prepared may be altered in shape, for example, by punching out a desired shape with a Thomson blade.

Figure 4:
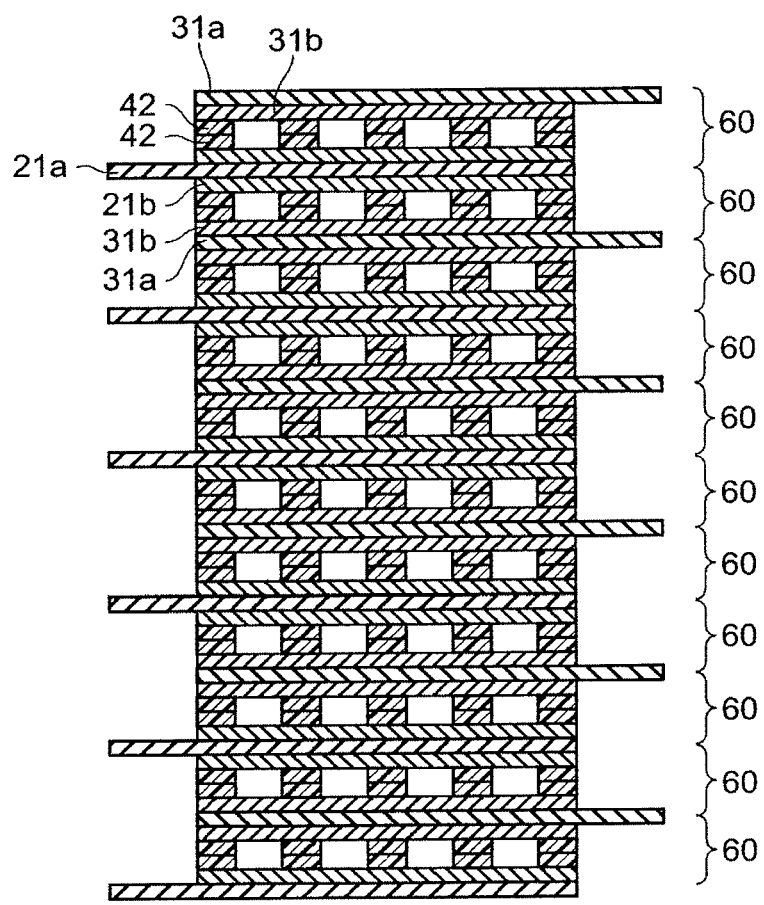
FIG. 4 is a cross-sectional view of a layered body of electrical storage units 60.

The positive electrodes and the negative electrodes are then stacked as illustrated in FIG. 4. The positive electrodes and the negative electrodes are press-bonded, for example, by thermocompression bonding to bond the first insulating layers 42 to the positive electrodes and the negative electrodes, thereby forming a layered body of electrical storage units 60.

The leads of the positive-electrode collector electrodes 21*a* of the layered body are welded (for example, by ultrasonic welding) to form the weld 22*a*, and the weld 22*a* is welded to the positive electrode tab 23*a*. Thus, the positive electrode tab 23*a* is electrically connected to the positive-electrode collector electrodes 21*a*.

Likewise, the leads of the negative-electrode collector electrodes 31*a* of the layered body are welded (for example, by ultrasonic welding) to form the weld 32*a*, and the weld 32*a* is welded to the negative electrode tab 33*a*. Thus, the negative electrode tab 33*a* is electrically connected to the negative-electrode collector electrodes 31*a*.

The layered body is wrapped with a film, such as an aluminum laminate film. For example, a polypropylene layer on the inside of the film is heated with an impulse sealer to temporarily seal the film, thereby forming the package 11. The electrolyte 18 is then supplied to the package 11. Sealing portions including the final sealing portion are completely sealed, for example, with a vacuum sealer to form the electric double layer capacitor 80.

2. Second Embodiment (1) Electrical Storage Device

Figure 7:
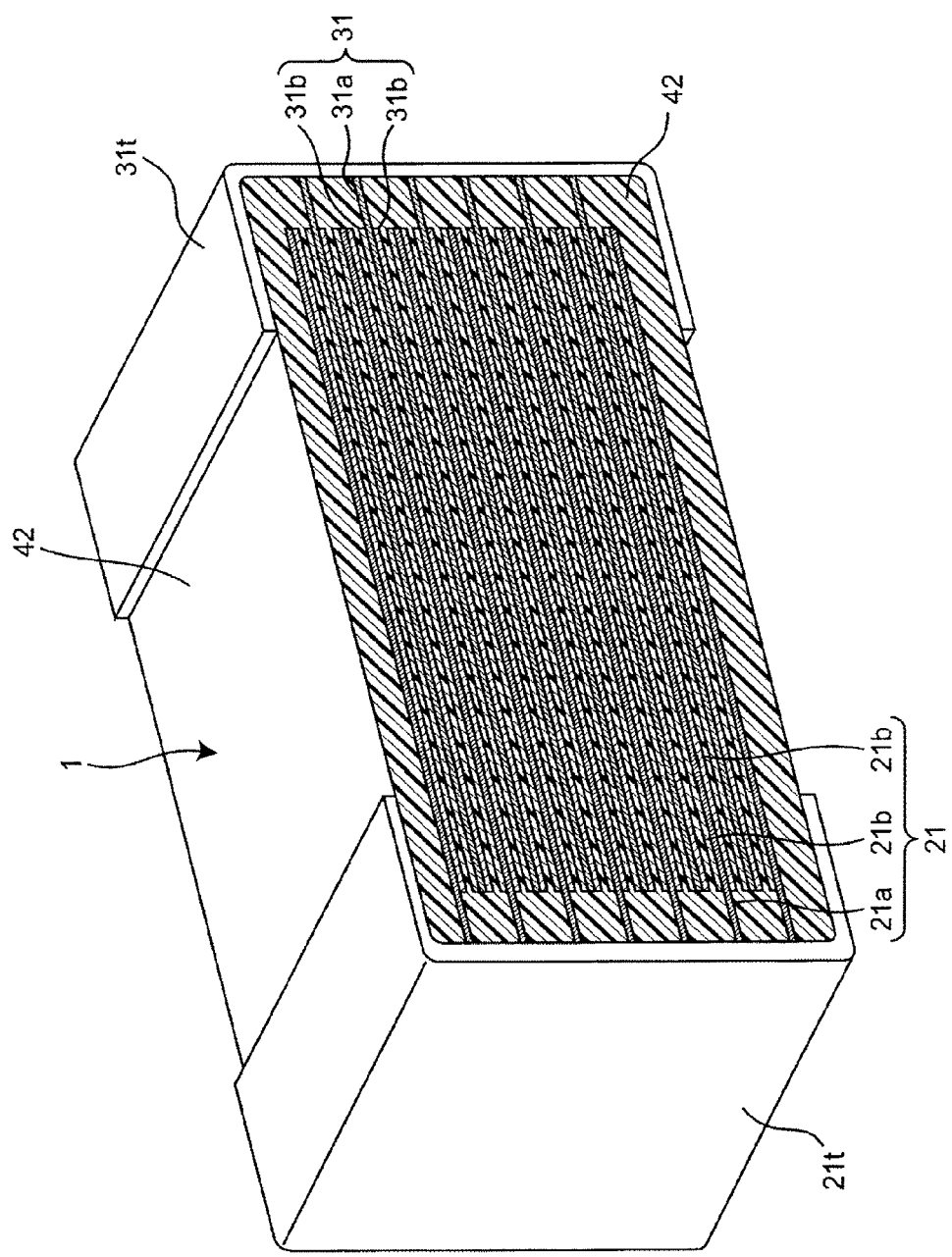
FIG. 7 is a fragmentary sectional perspective view of an electrochemical device according to a second embodiment.

FIG. 7 is a perspective view of an electrochemical device multilayer block 1 for use in an electrical storage device according to a second embodiment.

Figure 15:
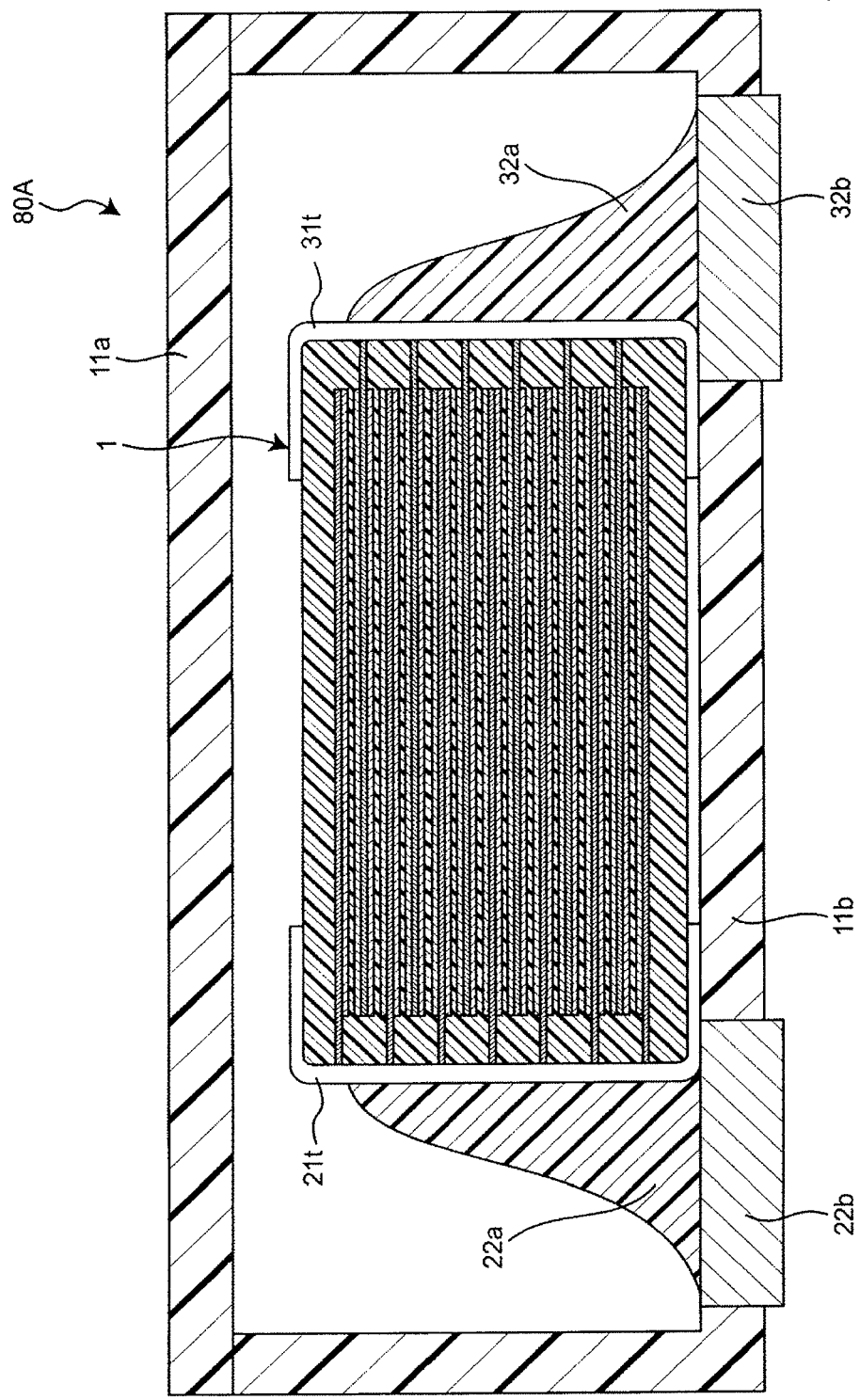
FIG. 15 is a cross-sectional view of an electric double layer capacitor 80A, which is an example of an electrical storage device including the electrochemical device multilayer block 1.

FIG. 15 is a cross-sectional view of an electric double layer capacitor 80A, which is an example of an electrical storage device including the electrochemical device multilayer block 1.

In FIG. 7, the front (indicated by hatching) of the electrochemical device multilayer block 1 is illustrated as a cross section in order to realize the rough arrangement of positive electrodes 21 (positive-electrode collector electrodes 21*a* and positive-electrode active material layers 21*b*) and negative electrodes 31 (negative-electrode collector electrodes 31*a* and negative-electrode active material layers 31*b*). Actually, as described in detail below with respect to a manufacturing method, the front is covered with a first insulating layer 42. An electrolyte is supplied to electrical storage units in the electrochemical device multilayer block 1 through a slit 25 in the first insulating layer 42 (see FIG. 10(7*b*)). Likewise, the rear of the electrochemical device multilayer block 1 (parallel to the front) is also covered with a first insulating layer 42 (not shown), which may have a slit 25.

Unless otherwise specified, a component having the same reference numeral as in the first embodiment may be made of the same material as in the first embodiment.

As described below, the electrochemical device multilayer block 1 together with an electrolyte can be housed in a package that includes a positive-electrode package electrode and a negative-electrode package electrode to form an electrical storage device, such as an electric double layer capacitor, a lithium-ion secondary battery, or a lithium-ion capacitor.

The electrochemical device multilayer block 1 is the same as the electric double layer capacitor 80 according to the first embodiment in that the electrochemical device multilayer block 1 includes a layered body of a plurality of electrical storage units each including a pair of the positive electrode 21 (the positive-electrode collector electrode 21*a* and the positive-electrode active material layer 21*b*) and the negative electrode 31 (the negative-electrode collector electrode 31*a* and the negative-electrode active material layer 31*b*) such that the positive-electrode active material layer 21*b* faces the negative-electrode active material layer 31*b* and the first insulating layer 42 disposed between the positive electrode and the negative electrode and bonded to part of a surface of the positive electrode and part of a surface of the negative electrode (details are omitted in FIG. 7) and in that the electrochemical device multilayer block 1 contains an electrolyte (not shown in FIG. 7) between the positive-electrode active material layer 21*b* and the negative-electrode active material layer 31*b* in each of the electrical storage units.

The electrochemical device multilayer block 1 is also the same as the electric double layer capacitor 80 in that the first insulating layer 42 is bonded to part of a surface of the positive-electrode active material layer 21*b* and part of a surface of the negative-electrode active material layer 31*b* to form a communication path between the positive-electrode active material layer 21*b* and the negative-electrode active material layer 31*b*.

The electrochemical device multilayer block 1 can be housed in a package, and an electrolyte can be supplied to the package. Thus, the electrolyte can be easily supplied to the electrical storage units.

This can prevent degradation or volatilization of the electrolyte caused by heating while the electrical storage units are stacked.

Since the electrolyte can be supplied after the formation of the layered body, there is no need to handle the electrical storage units containing the electrolyte while the electrical storage units are stacked. Thus, the process can be simple and efficient.

Furthermore, since the electrolyte reaches the inside of the electrical storage units in a shorter time, it is advantageously easy to supply the electrolyte.

In the manufacture of an electrical storage device including the electrochemical device multilayer block 1, the electrolyte is not necessarily supplied to the electrochemical device multilayer block 1 after the electrical storage units are stacked. The electrolyte 18 may be supplied before the electrical storage units are stacked and/or while the electrical storage units are stacked. The electrolyte 18 may be additionally supplied after the electrical storage units are stacked.

As described in detail below with respect to a method for manufacturing the electrochemical device multilayer block 1, although the electrochemical device multilayer block 1 includes a separator layer 14, the separator layer 14 may be omitted. The separator layer 14 can be omitted to reduce resistance.

The electric double layer capacitor 80A including the electrochemical device multilayer block 1 will be described below with reference to FIG. 15.

The electrochemical device multilayer block 1 is disposed in a package, which includes a package base 11*b* and a package lid 11a. The package base 11b and the package lid 11a may be formed of a heat-resistant resin, such as a liquid crystal polymer.

A positive-electrode package electrode 22b and a negative-electrode package electrode 32b each made of a metal, such as aluminum, are separately disposed in the package base 11b.

A positive-electrode terminal electrode 21t of the electrochemical device multilayer block 1 electrically connected to a plurality of positive-electrode collector electrodes 21a is electrically connected to the positive-electrode package electrode 22b with an electrically conductive adhesive 22a. Likewise, a negative-electrode terminal electrode 31t of the electrochemical device multilayer block 1 electrically connected to a plurality of negative-electrode collector electrodes 31a is electrically connected to the negative-electrode package electrode 32b with an electrically conductive adhesive 32a.

The package including the package base 11b and the package lid 11a contains an electrolyte.

The electrolyte supplied to the package after the electrochemical device multilayer block 1 has been placed in the package reaches the inside of the electrical storage units through the slit 25.

(2) Manufacturing Method

Figure 8:
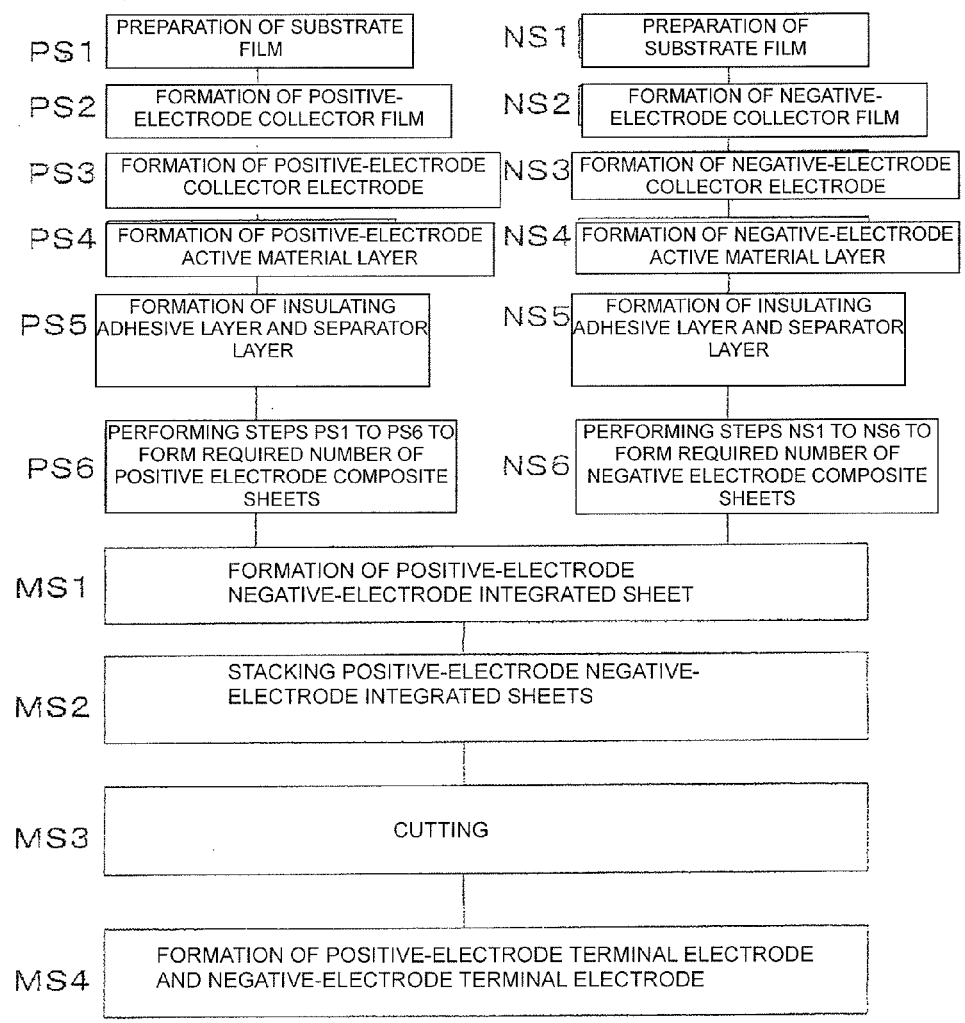
FIG. 8 is a process flow chart of a method for manufacturing an electrical storage device according to the second embodiment of the present invention.

FIG. 8 is a process flow chart of a method for manufacturing an electrical storage device (the electrochemical device multilayer block 1) according to the second embodiment of the present invention. Each process will be described below with reference to the process flow of FIG. 8.

i) Formation of Positive-Electrode Composite Sheet 20A
<Step PS1>

Figure 9:
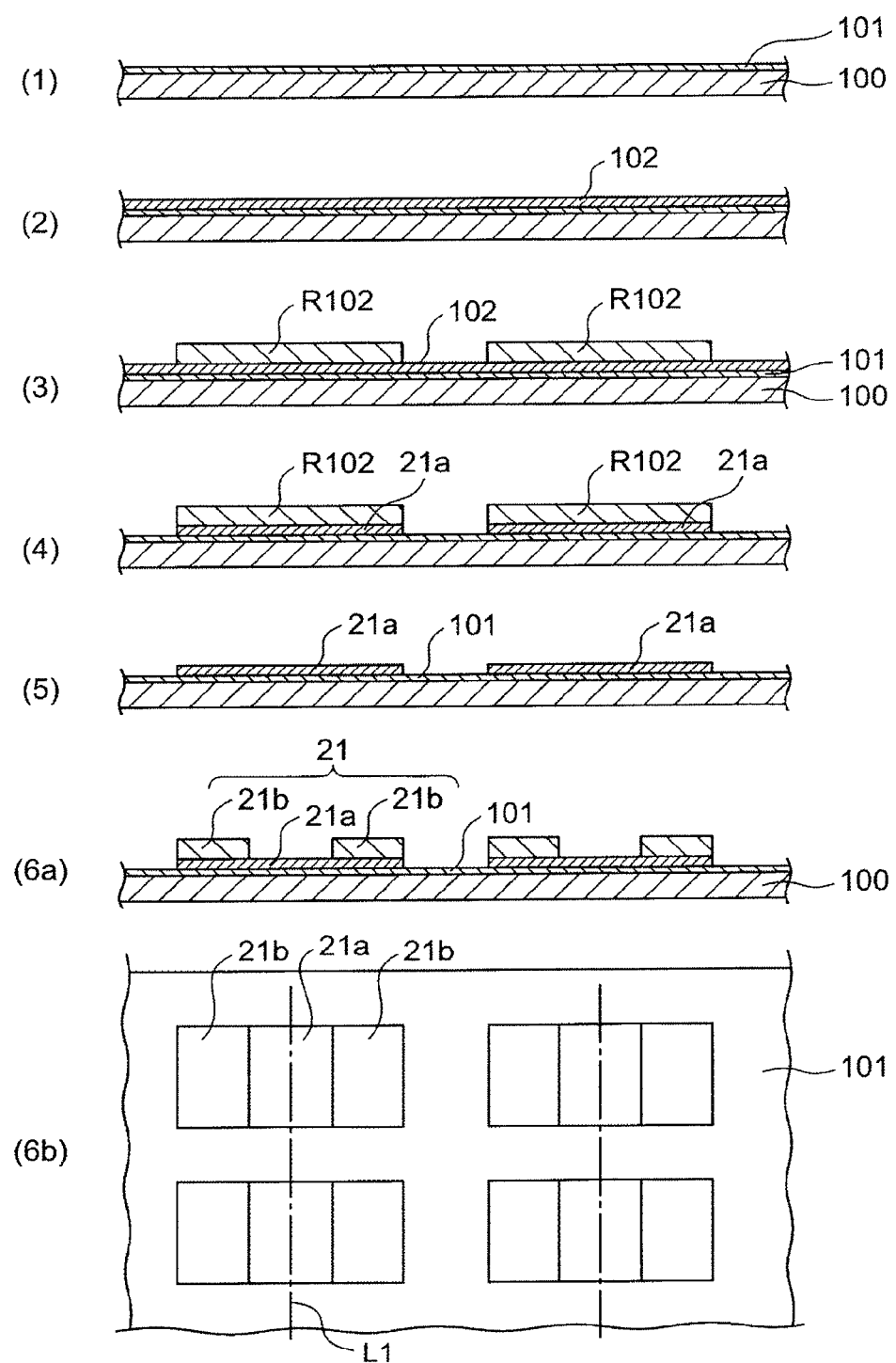
FIG. 9 illustrates the method for manufacturing an electrical storage device according to the second embodiment in which a positive electrode 21 is formed on a substrate film 100.

As illustrated in FIG. 9(1), a poly(ethylene terephthalate) substrate film 100 is prepared. A silicone mold-releasing layer 101 is disposed on the substrate film 100.

A substrate film having mold releasability can be used without mold-releasing treatment.

A substrate film having no mold releasability is preferably subjected to mold-releasing treatment, such as the formation of the mold-releasing layer 101. The mold-releasing treatment is also preferably performed to improve mold releasability.

Examples of the substrate film 100 include plastic films, such as polypropylene, polyester, polycarbonate, polyamide, polyamideimide, polyethylene, fluoropolymer, and cellulose acetate films, cellophane, and paper.

The mold-releasing treatment method may be a method of applying a silicone resin, wax, surfactant, metal oxide, or fluoropolymer to a substrate film.

The mold-releasing layer 101 may be mainly formed of one or two or more resins selected from nitrocellulose, rigid poly(vinyl chloride), polyamide, polyester, melamine resin, urea resin, epoxy resin, and urethane resin. These resins may be applied to the substrate film by gravure printing.

<Step PS2>

As illustrated in FIG. 9(2), a positive-electrode collector film 102 is formed on top of the substrate film 100, for example, by vapor deposition.

The positive-electrode collector film 102 formed on top of the substrate film 100 having a smooth surface has high continuity and low resistance in spite of its small thickness. This can effectively reduce the size and height of the electrical storage device. The positive-electrode collector film 102 may be formed using a known technique, such as sputtering or coating, as well as vapor deposition. Since vapor deposition or sputtering can form a film having high continuity and low resistance, vapor deposition or sputtering facilitates the formation of a collector film having a small thickness and reduction of the size and height of the electrical storage device.

<Step PS3>

As illustrated in FIG. 9(3), a plurality of resist patterns R102 are printed on the positive-electrode collector film 102 at predetermined intervals and are dried. The resist patterns R102 may be arranged in a matrix form and may have the same rectangular shape as the positive-electrode collector electrodes 21a.

As illustrated in FIG. 9(4), the positive-electrode collector film 102 is etched using the resist patterns R102 as an etching mask. The resist patterns R102 are then removed as illustrated in FIG. 9(5). Thus, the rectangular positive-electrode collector electrodes 21a are formed.

The masking method may be a method of printing a resist by screen printing or gravure printing, photolithography using a coating-type resist, or photolithography using a dry film resist. Screen printing or gravure printing is preferred in terms of cost. Photolithography is preferred in terms of precision.

In addition to the method of etching the collector film, the collector electrode may be formed by direct vapor deposition of the collector film on the mold-releasing layer disposed on the substrate film using a metal mask or direct vapor deposition of the collector film using an oil mask followed by plasma ashing.

When the positive-electrode collector electrodes 21a form an oxide film on the surface thereof, the oxide film is preferably removed after the formation of the positive-electrode collector electrodes 21a. For example, in the case of the positive-electrode collector electrodes 21a made of aluminum (Al), the positive-electrode collector electrodes 21a can be passed through a mixture of hydrofluoric acid and sulfuric acid to remove an oxide film on the aluminum surface.

<Step PS4>

As illustrated in FIGS. 9(6a) and 9(6b), two positive-electrode active material layers 21b are formed on each surface of the positive-electrode collector electrodes 21a.

The positive-electrode active material layers 21b can be formed by screen printing of an active material slurry on the positive-electrode collector electrodes 21a. The positive-electrode active material layers 21b can be symmetrical about the center line L1 that is perpendicular to the longitudinal direction of the positive-electrode collector electrodes 21a and are disposed at a predetermined distance from the center line L1.

The side surfaces of the positive-electrode active material layers 21b other than the side surfaces facing each other across the center line L1 preferably coincide with the peripheries of the positive-electrode collector electrodes 21a.

<Step PS5>

Figure 10:
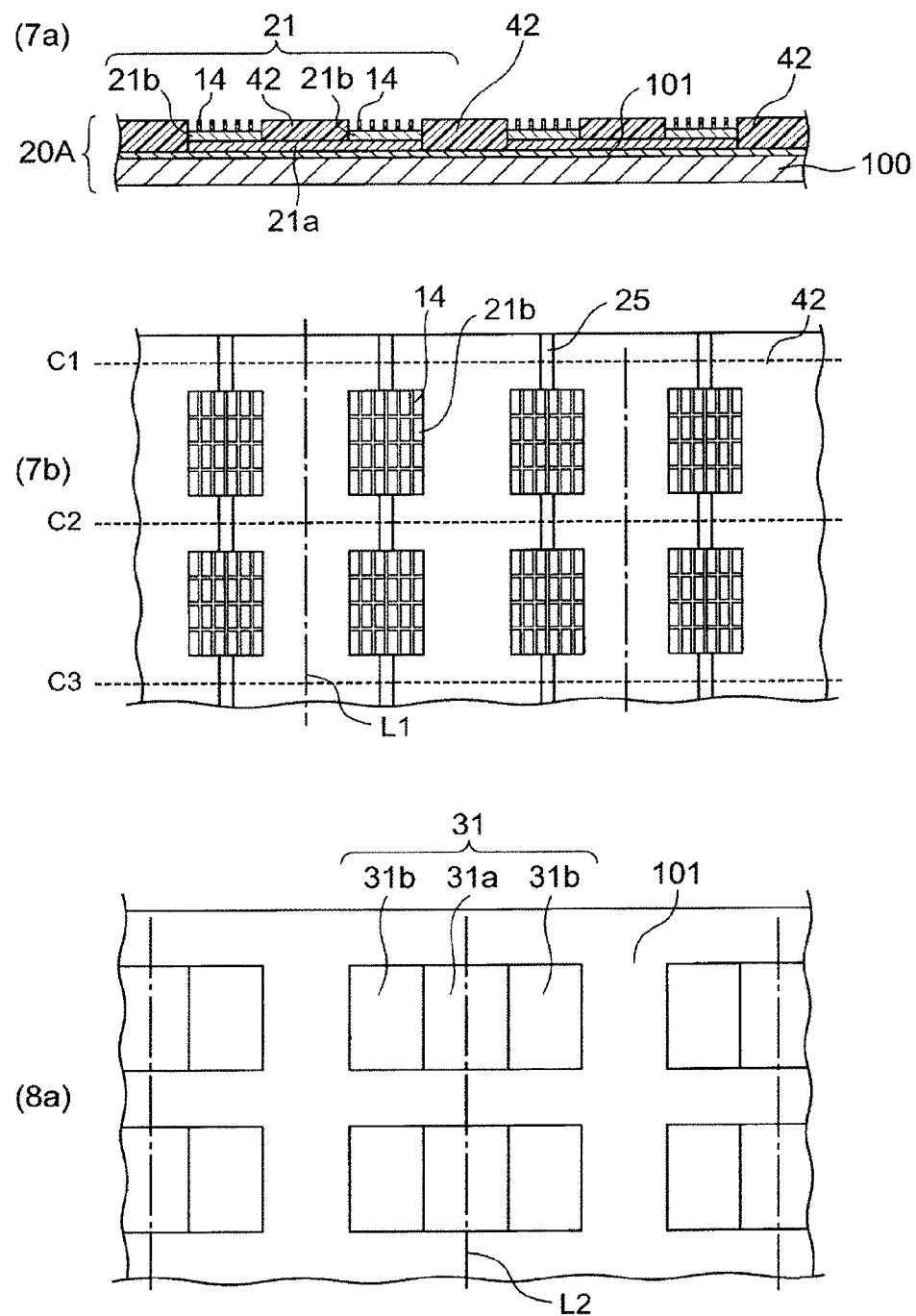
FIG. 10 illustrates a step of forming first insulating layers 42 on the positive electrode 21 to form a positive-electrode composite sheet 20A and a step of forming a negative-electrode collector electrode 31$a$ and a negative-electrode active material layer 31$b$ in the method for manufacturing an electrical storage device according to the second embodiment.

As illustrated in FIGS. 10(7a) and 10(7b), a separator layer 14 is then formed on the positive-electrode active material layers 21b such that exposed portions of the positive-electrode active material layers 21b are arranged in a grid-like pattern.

A first insulating layer 42 is then formed on the mold-releasing layer 101 and the positive-electrode collector electrodes 21a such that the first insulating layer 42 surrounds the positive-electrode active material layers 21b. As illustrated in (7b), the slits 25 in contact with the positive-electrode active material layers 21b are formed in the first insulating layer 42. In FIG. 10(7b), the slits 25 pass through the first insulating layer 42.

As described above, although not shown in FIG. 7, the front of the electrochemical device multilayer block 1 (indicated by hatching in FIG. 7) is covered with the first insulating layer 42. Likewise, the rear of the electrochemical device multilayer block 1 (parallel to the front) is also covered with the first insulating layer 42.

A plurality of electrical storage units (or intermediates of the electrical storage units) aligned in the longitudinal direction in FIG. 107(b) can be cut into pieces, for example, along C1, C2, and C3 lines in FIG. 10(7b) before the step MS3 described below. Thus, the front and rear of the electrochemical device multilayer block 1 are covered with the first insulating layer 42.

The first insulating layer 42 on the front and rear of the electrochemical device multilayer block 1 includes the slit 25. The slit 25 serves as a communication path. The electrolyte can enter the electrochemical device multilayer block 1 through the slit 25.

A gas generated in the electrical storage units of the electrochemical device multilayer block 1 can be discharged from the electrical storage units (the electrochemical device multilayer block 1) through the communication path.

Through the steps PS1 to PS5, a positive-electrode composite sheet 20A is formed.

<Step PS6>

In the step PS6, the steps PS1 to PS5 are repeatedly performed to prepare a required number of positive-electrode composite sheets 20A.

Preparation of Negative-Electrode Composite Sheet 30A

As illustrated in FIG. 8, in the same manner as the steps PS1 to PS6 of forming the positive-electrode composite sheet 20A, negative-electrode composite sheets 30A are prepared in accordance with the steps NS1 to NS6.

Figure 11:
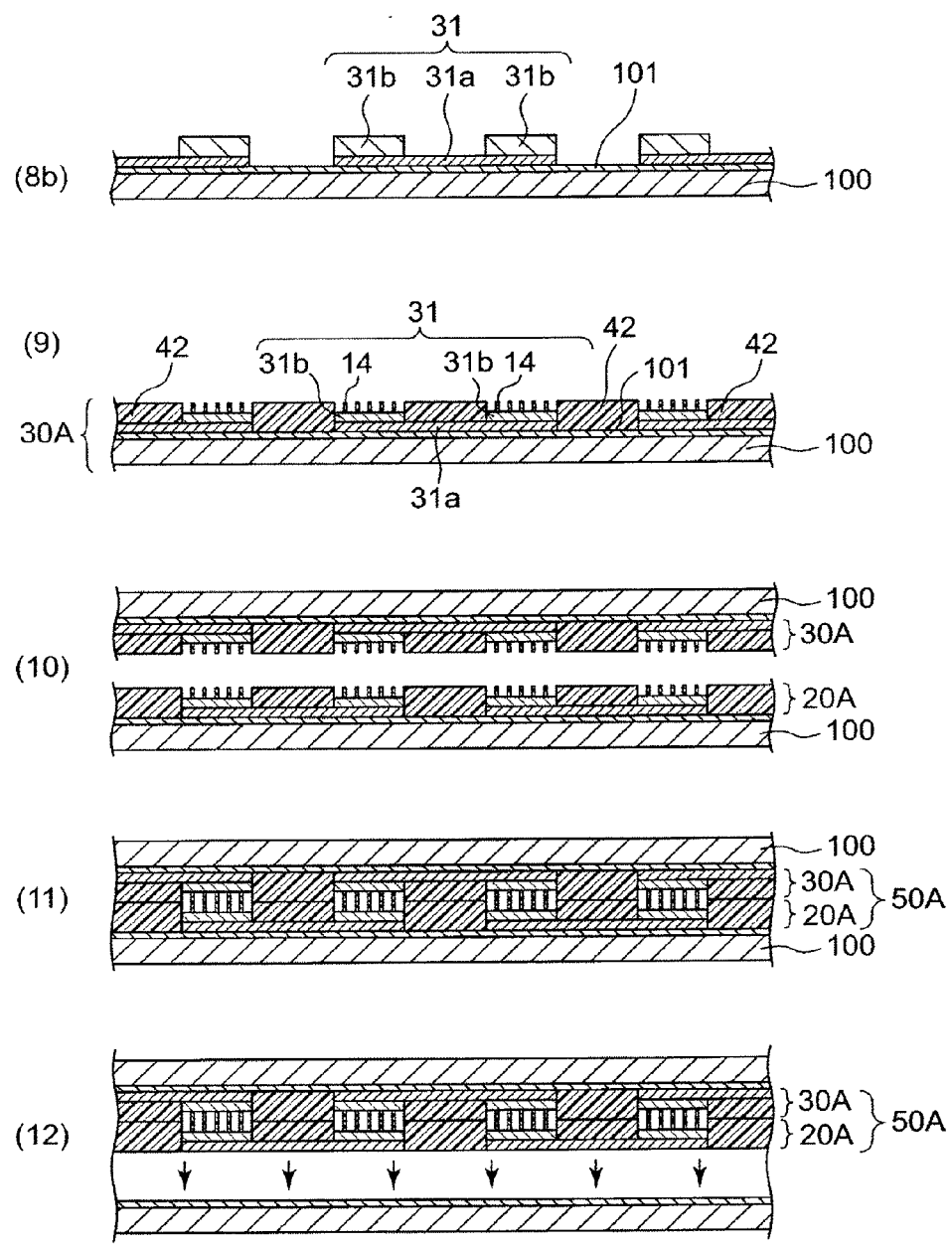
FIG. 11 illustrates a step of forming a positive-electrode negative-electrode integrated sheet 50A in the method for manufacturing an electrical storage device according to the second embodiment.

In the negative-electrode composite sheets 30A, as illustrated in FIG. 10(8a) and FIG. 11(8b), the center line L2 of the negative-electrode collector electrode 31a that is perpendicular to the longitudinal direction is disposed in the middle of the center lines L1 of the positive-electrode collector electrodes 21a in the positive-electrode composite sheet 20A. The negative-electrode active material layers 31b are symmetrical about the center line L2 and overlap the positive-electrode active material layers 21b.

In the steps NS2 to NS4, a negative-electrode collector film, negative-electrode collector electrodes 31a, and negative-electrode active material layers 31b are formed instead of the positive-electrode collector film 102, the positive-electrode collector electrodes 21a, and the positive-electrode active material layers 21b in the steps PS2 to PS4. In the manufacture of an electric double layer capacitor serving as an electrical storage device, the positive-electrode collector film 102 is the same as the negative-electrode collector film, the positive-electrode collector electrodes 21a are the same as the negative-electrode collector electrodes 31a, and the positive-electrode active material layers 21b are the same as the negative-electrode active material layers 31b.

The shapes and areas of the positive-electrode collector electrodes 21a and the negative-electrode collector electrodes 31a may be the same or different. The shapes and areas of the positive-electrode active material layers 21b and the negative-electrode active material layers 31b may be the same or different. In consideration of misregistration of the positive electrode 21 or the negative electrode 31, one of the positive electrode 21 and the negative electrode 31 may have a larger area than the other. This can maintain a constant opposite surface area of the positive electrode 21 and the negative electrode 31 even in the case of misregistration of the positive electrode 21 or the negative electrode 31 and reduce variations in resistance or capacitance of the electric double layer capacitor.

In the present specification, when common items of the positive electrode and the negative electrode are described without distinction, the positive-electrode composite sheet 20A and the negative-electrode composite sheet 30A may be referred to only as a composite sheet, the positive-electrode collector electrodes 21a and the negative-electrode collector electrodes 31a may be referred to only as collector electrodes, and the positive-electrode active material layers 21b and the negative-electrode active material layers 31b may be referred to only as active material layers.

Although the active material layers are applied after the formation of the collector electrodes in the second embodiment, the composite sheet may be formed by first forming a first insulating layer or a second insulating layer on the substrate film 100, forming an active material layer, and forming a collector electrode.

As described in the second embodiment, however, when the active material layers are formed on the collector electrodes, a binder in the active material layers deposits in the vicinity of the interface between the active material layers and the collector electrodes and can increase the bond strength between the active material layers and the collector electrodes.

Furthermore, as described in the second embodiment, the formation of the active material layers on the thin collector electrodes having high continuity can further reduce the size and height of the electrical storage device.

Although the formation of a collector electrode on an active material layer makes it difficult to etch the collector electrode or remove an oxide film of the collector electrode, the active material layers are formed on the collector electrodes in the second embodiment. Thus, the active material layers can be formed after the collector electrodes are etched or an oxide film of the collector electrodes is removed. Thus, the etching and the removal of an oxide film are easy to perform.

iii) Preparation and Stacking of Positive-Electrode Negative-Electrode Integrated Sheet <Step MS1>

As illustrated in FIG. 11(10), the positive-electrode composite sheet 20A and the negative-electrode composite sheet 30A are arranged such that the surfaces on which the first insulating layers 42 are formed face each other and are uniformly pressed from both sides, for example, using pressure plates (not shown) under heating, thereby bonding the first insulating layers 42 together as illustrated in FIG. 11(11). Thus, a positive-electrode negative-electrode integrated sheet 50A is formed.

The pressure plates may be pressed at a temperature of 150° C. at a pressure of 20 MPa for 30 seconds.

In the positive-electrode negative-electrode integrated sheet 50A formed by bonding the first insulating layers 42 together, the positive-electrode composite sheet 20A and the negative-electrode composite sheet 30A on both sides of the bonded surface have substantially the same expansion and contraction characteristics. Thus, the positive-electrode negative-electrode integrated sheet 50A suffers little warping due to bonding and is easy to handle in the subsequent manufacturing process.

Since the positive-electrode composite sheet 20A and the negative-electrode composite sheet 30A are bonded together to form the positive-electrode negative-electrode integrated sheet 50A, even the positive-electrode composite sheet 20A and the negative-electrode composite sheet 30A each having a small thickness can be further easily handled while proper arrangements and predetermined positions are maintained. Thus, the device can be further reduced in size and height.

The positive-electrode negative-electrode integrated sheet 50A includes a plurality of electrical storage units arranged in the transverse direction. In each of the electrical storage units, the separator layer 14 is disposed between the positive-electrode active material layer 21b and the negative-electrode active material layer 31b and is bonded to part of a surface of each of the positive-electrode active material layer 21b and the negative-electrode active material layer 31b. The separator layer 14 prevents the contact and short circuit between the positive-electrode active material layer 21b and the negative-electrode active material layer 31b.

As described in the second embodiment, in the positive-electrode negative-electrode integrated sheet 50A, voids between the positive-electrode active material layer 21b and the negative-electrode active material layer 31b preferably communicate with the outside of the positive-electrode negative-electrode integrated sheet 50A through the slit 25. In the formation of the positive-electrode negative-electrode integrated sheet 50A by bonding the positive-electrode composite sheet 20A to the negative-electrode composite sheet 30A, such voids can prevent a gas (such as air) from being excessively sealed between the positive-electrode composite sheet 20A and the negative-electrode composite sheet 30A and changing the shape of the positive-electrode negative-electrode integrated sheet 50A due to expansion.

After the first insulating layers are bonded together, the substrate film 100 on either the negative-electrode composite sheet 30A or the positive-electrode composite sheet 20A is removed.

For example, as illustrated in FIG. 11(12), the substrate film 100 on the positive electrode can be removed by lifting the positive-electrode negative-electrode integrated sheet 50A with a sucker (not shown) disposed on the negative electrode of the positive-electrode negative-electrode integrated sheet 50A.

In order to remove the substrate film 100 from the positive electrode, the bonding strength between the substrate film 100 and the positive-electrode composite sheet 20A must be lower than the bonding strength between the positive-electrode composite sheet 20A and the negative-electrode composite sheet 30A. This difference in bonding strength can be relatively easily realized in the case that a mold-releasing layer is disposed between the substrate film 100 and the positive-electrode composite sheet 20A.

In the case that no mold-releasing layer is disposed between the substrate film 100 and the positive-electrode composite sheet 20A, the difference in bonding strength can be realized by bonding the positive-electrode composite sheet 20A to the negative-electrode composite sheet 30A at high temperature and pressure. However, bonding at high temperature and pressure requires attention to crushing of voids in the active material layer and the separator layer and deformation of the positive-electrode composite sheet 20A and the negative-electrode composite sheet 30A.

When a collector electrode is formed on a substrate film by vapor deposition, thermal damage to the substrate film and implantation of deposited particles in the substrate film due to their kinetic energy can enhance adhesion with the substrate film. Thus, it may be difficult to remove the substrate film without a mold-releasing layer. Thus, it is preferable to form a mold-releasing layer having a thickness sufficient to prevent damage to the substrate film.

The substrate film 100 on the negative electrode can be removed by lifting the positive-electrode negative-electrode integrated sheet 50A with a sucker disposed on the positive electrode of the positive-electrode negative-electrode integrated sheet 50A.

A required number of positive-electrode negative-electrode integrated sheets 50A are formed in this manner. The substrate film 100 is bonded to either the positive-electrode composite sheet 20A or the negative-electrode composite sheet 30A.

iv) Stacking of Positive-Electrode Negative-Electrode Integrated Sheets

<Step MS2>

Figure 12:
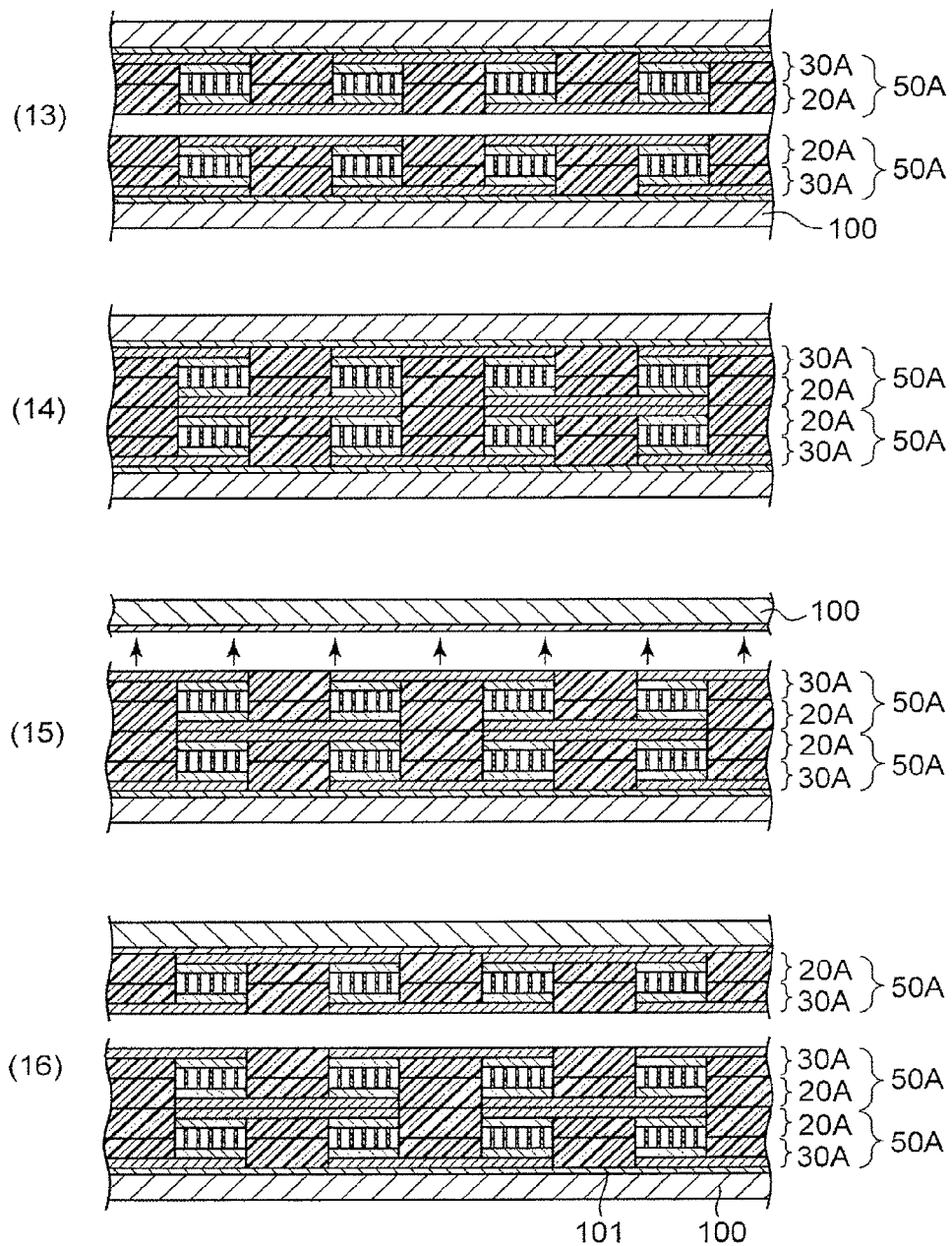
FIG. 12 illustrates a step of stacking positive-electrode negative-electrode integrated sheets in the method for manufacturing an electrical storage device according to the second embodiment.

First, as illustrated in FIG. 12(13), one positive-electrode negative-electrode integrated sheet 50A having a sucker disposed on the negative electrode is placed on another positive-electrode negative-electrode integrated sheet 50A having the substrate film 100 bonded to the negative-electrode composite sheet 30A and facing downward. As illustrated in FIG. 12(14), the two positive-electrode negative-electrode integrated sheets 50A are uniformly pressed and bonded together using pressure plates (not shown).

The pressure plates may be pressed at a temperature of 150° C. at a pressure of 20 MPa for 30 seconds.

In order to manufacture the electrochemical device multilayer block 1 including the insulating layer on the top and bottom layers, as illustrated in FIG. 7, an insulating layer sheet including an insulating layer having a predetermined thickness (for example, 6 μm) alone on a substrate film is used, and a positive-electrode negative-electrode integrated sheet 50A is first stacked on the insulating layer of the insulating layer sheet.

As illustrated in FIG. 12(15), the substrate film 100 is removed from the negative electrode of the positive-electrode negative-electrode integrated sheet 50A having the sucker disposed on the negative electrode.

Figure 13:
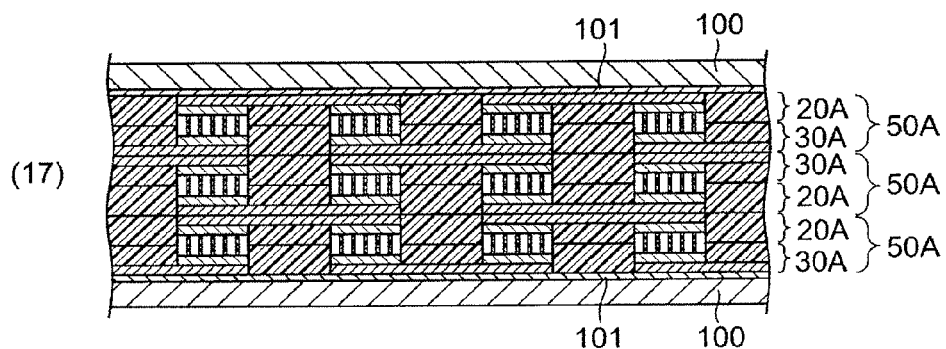
FIG. 13(17) is a cross-sectional view of another positive-electrode negative-electrode integrated sheet 50A stacked on the layered positive-electrode negative-electrode integrated sheets 50A in the method for manufacturing an electrical storage device according to the second embodiment.

As illustrated in FIG. 12(16), the positive-electrode negative-electrode integrated sheet 50A from which the substrate film 100 on the negative electrode has been removed is placed under another positive-electrode negative-electrode integrated sheet 50A from which the substrate film 100 on the negative electrode has been removed such that the negative electrodes face each other. As illustrated in FIG. 13(17), the negative electrodes are bonded together.

After the substrate film 100 on the positive electrode of that other positive-electrode negative-electrode integrated sheet 50A is removed, a positive-electrode negative-electrode integrated sheet 50A from which the substrate film 100 on the positive electrode has been removed is disposed on that other positive-electrode negative-electrode integrated sheet 50A such that the positive electrodes face each other, and the positive electrodes are bonded together.

Figure 14:
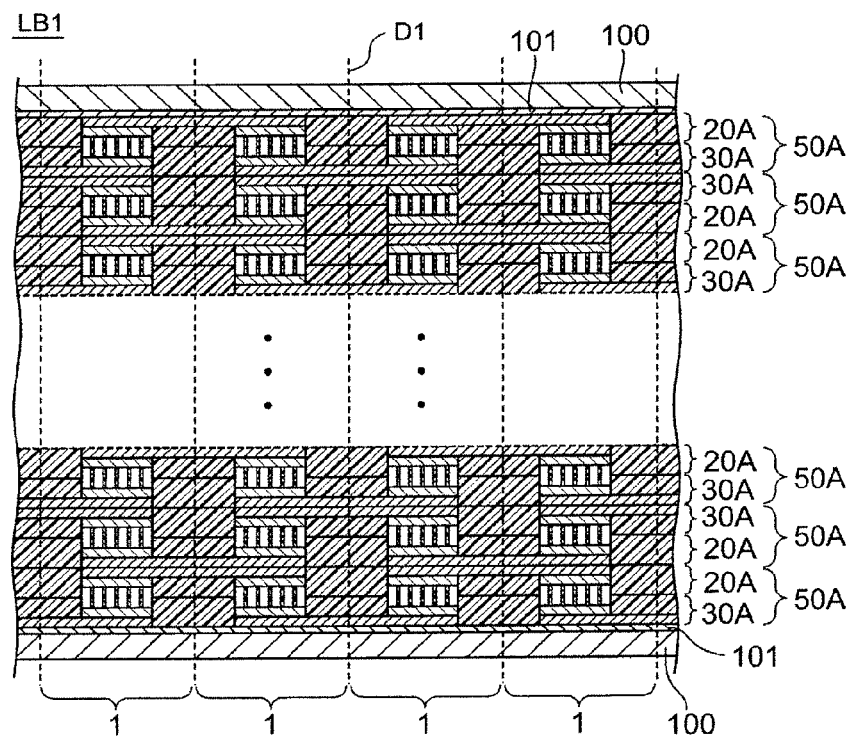
FIG. 14 is a cross-sectional view of an electrochemical device multilayer sheet LB1 including layered positive-electrode negative-electrode integrated sheets 50A according to the second embodiment.

The steps MS1 and MS2 are repeatedly performed to form the electrochemical device multilayer sheet LB1 including stacked positive-electrode negative-electrode integrated sheets 50A, as illustrated in FIG. 14.

In order to manufacture the electrochemical device multilayer block 1 including the insulating layer on the outermost layers, as illustrated in FIG. 7, the first insulating layer sheet including an insulating layer alone is used, and finally the insulating layers of the first insulating layer sheets are oppositely bonded.

In the electrochemical device multilayer block 1 thus formed, the outermost positive-electrode collector electrode 21a and negative-electrode collector electrode 31a are a single layer as illustrated in FIG. 14 and have a smaller thickness than the inner collector electrodes each including two positive-electrode collector electrodes 21a or negative-electrode collector electrodes 31a. In FIG. 7, however, because of constraints on drawing, all the positive-electrode collector electrodes and the negative-electrode collector electrodes have the same thickness.

The thicknesses of the collector electrodes and the active material layers may be the same or different at different positions or using different forming methods. Although the positive-electrode collector electrode 21a and the negative-electrode collector electrode 31a are directly formed on the mold-releasing layer 101 disposed on the substrate film 100 in the second embodiment, an adhesive layer, such as a urethane resin, may be formed on the mold-releasing layer 101 disposed on the substrate film 100, and the positive-electrode collector electrode and the negative-electrode collector electrode may be formed on the adhesive layer.

In this case, when the positive-electrode negative-electrode integrated sheets 50A are bonded together as illustrated in FIG. 12(14), the adhesive layer separated from the substrate film 100 is left on the positive-electrode negative-electrode integrated sheet 50A, and the positive-electrode collector electrodes or the negative-electrode collector electrodes are more securely bonded together via the adhesive layer. This can further improve the reliability of the electrical storage device.

<Step MS3>

After the substrate film 100 is removed from the top and bottom layers of the electrochemical device multilayer sheet LB1, the electrochemical device multilayer sheet LB1 is cut along the cut line D1 to form the electrochemical device multilayer block 1.

In other words, electrical storage units stacked in longitudinal direction and arranged in the transverse direction are cut into a single line of stacked electrical storage units, which serves as the electrochemical device multilayer block 1.

In this step, the substrate film 100 may be removed after the electrochemical device multilayer sheet LB1 is divided.

<Step MS4>

As illustrated in FIG. 7, the positive-electrode terminal electrode 21t is formed on a cut surface of the electrochemical device multilayer block 1 from which the positive-electrode collector electrodes 21a are exposed, and the negative-electrode terminal electrode 31t is formed on a cut surface of the electrochemical device multilayer block 1 from which the negative-electrode collector electrodes 31a are exposed.

The positive-electrode terminal electrode 21t and the negative-electrode terminal electrode 31t can be formed, for example, by depositing aluminum on the side surfaces of the electrochemical device multilayer block 1 by sputtering.

In addition to sputtering, the positive-electrode terminal electrode 21t and the negative-electrode terminal electrode 31t may be formed by directly forming an electrically conductive film on the side surfaces of the electrochemical device multilayer block 1 by vapor deposition, ion plating, thermal spraying, cold spraying, or plating.

Alternatively, the positive-electrode terminal electrode 21t and the negative-electrode terminal electrode 31t may be formed by directly applying an electrically conductive adhesive to the side surfaces of the electrochemical device multilayer block 1 by dipping.

A communication path is preferably not exposed on the side surfaces of the electrochemical device multilayer block 1 on which the positive-electrode terminal electrode 21t or the negative-electrode terminal electrode 31t is to be formed. If a communication path is exposed, the positive-electrode terminal electrode 21t or the negative-electrode terminal electrode 31t may enter the electrical storage unit and develop a short circuit with the positive electrode or the negative electrode.

As illustrated in FIG. 15, the electrochemical device multilayer block 1 including the positive-electrode terminal electrode 21t and the negative-electrode terminal electrode 31t on the side surfaces is housed together with an electrolyte in a package that includes the positive-electrode package electrode 22b and the negative-electrode package electrode 32b, thereby constituting an electrical storage device, such as the electric double layer capacitor 80A.

Before the electrochemical device multilayer block 1 is housed in the package, for example, electrically conductive adhesives 22a and 32a containing electrically conductive gold particles are applied to the positive-electrode terminal electrode 21t and the negative-electrode terminal electrode 31t by dipping. The electrochemical device multilayer block 1 is then placed such that the electrically conductive adhesive 22a and the electrically conductive adhesive 32a are connected to the positive-electrode package electrode 22b and the negative-electrode package electrode 32b, respectively.

The package including the electrochemical device multilayer block 1 is heated, for example, at 170° C. for 10 minutes, to cure the electrically conductive adhesives 22a and 32a and fix the electrochemical device multilayer block 1 to the package electrodes 22b and 32b. Thus, the positive-electrode terminal electrode 21t and the negative-electrode terminal electrode 31t are electrically connected to the positive-electrode package electrode 22b and the negative-electrode package electrode 32b.

The electrically conductive particles may be made of carbon, silver, copper, or aluminum, as well as gold, depending on the application.

The electrochemical device multilayer block 1 in the package includes the slit 25 on the front and rear thereof, and the electrical storage units include communication paths. Thus, the electrolyte is rapidly supplied between the positive-electrode active material layer 21a and the negative-electrode active material layer 31b in the electrical storage units.

A method for manufacturing the electrochemical device multilayer block 1 according to the second embodiment includes forming the positive-electrode composite sheet 20A or the negative-electrode composite sheet 30A on the substrate film 100 and removing the positive-electrode composite sheet 20A or the negative-electrode composite sheet 30A from the substrate film 100.

Thus, the patterned positive-electrode collector electrodes 21a and the patterned positive-electrode active material layers 21b can be integrally formed on one continuous first insulating layer.

Likewise, the patterned negative-electrode collector electrodes 31a and the patterned negative-electrode active material layers 31b can be integrally formed on one continuous first insulating layer.

Thus, many electrochemical device multilayer blocks 1 can be simultaneously manufactured by the method according to the second embodiment. This improves productivity as compared with a known method by which electric double layer capacitors are individually handled.

The patterned positive-electrode collector electrodes 21a or the patterned negative-electrode collector electrodes 31a are integrated with the single first insulating layer 42 in accordance with the manufacturing method of the second embodiment. Thus, the electrodes are easy to handle. The positive-electrode composite sheet 20A and the negative-electrode composite sheet 30A are supported by the substrate film 100 until they are stacked. This further facilitates the handling of the electrodes.

Thus, even when the thickness of the positive-electrode collector electrodes 21a or the negative-electrode collector electrodes 31a is reduced, the electrodes are easy to handle. Thus, the electrochemical device multilayer block 1 can be further reduced in size.

The patterned positive-electrode collector electrodes 21a and/or the patterned negative-electrode collector electrodes 31a and the positive-electrode active material layers 21b and/or the negative-electrode active material layers 31b are integrated with the first insulating layer 42 in accordance with the manufacturing method of the second embodiment. Thus, they are easy to handle in the manufacturing process even when the electrochemical device multilayer block 1 is reduced in size. Thus, the electrochemical device multilayer block 1 can be further reduced in size.

The adjacent positive electrode 21 and negative electrode 31 are bonded and fixed via the first insulating layer 42 in accordance with the manufacturing method of the second embodiment. Thus, misregistration of the positive electrode 21 and the negative electrode 31 can be prevented during the manufacturing process and after the completion of the manufacturing process.

This facilitates the handling and stacking of the sheets in the manufacturing process and prevents changes in characteristics, such as capacitance, after the completion of the manufacturing process.

In the manufacturing method according to the second embodiment, surfaces of collector electrodes each having an active material layer on the other surface face each other. Thus, collector electrodes having the active material layer on both sides can be easily formed, and the electrochemical device multilayer block 1 can have a high volume capacity ratio.

In accordance with a known manufacturing method, it is difficult to form an active material layer on both sides of a collector foil in terms of handling.

In the present embodiment, the first insulating layers 42 of the positive-electrode composite sheet 20A and the negative-electrode composite sheet 30A are bonded together to form the positive-electrode negative-electrode integrated sheet 50A, and the positive-electrode negative-electrode integrated sheets 50A are stacked to form the electrochemical device multilayer sheet LB1. However, a method for forming an electrochemical device multilayer sheet is not limited to this embodiment. An electrochemical device multilayer sheet may be formed as described below.

For example, surfaces of two positive-electrode composite sheets 20A from which the substrate film 100 has been removed are bonded together such that the positive-electrode collector electrodes 21a face each other to form a positive-electrode positive-electrode integrated sheet. Likewise, surfaces of two negative-electrode composite sheets 30A from which the substrate film 100 has been removed are bonded together such that the negative-electrode collector electrodes 31a face each other to form a negative-electrode negative-electrode integrated sheet. The positive-electrode positive-electrode integrated sheet and the negative-electrode negative-electrode integrated sheet are bonded together such that the first insulating layers 42 face each other to form a layered sheet. The positive-electrode positive-electrode integrated sheet of the layered sheet is bonded to another negative-electrode negative-electrode integrated sheet such that the first insulating layers 42 face each other.

This stacking process is repeatedly performed to form an electrochemical device multilayer sheet.

The electrochemical device multilayer block 1 and the electric double layer capacitor 80A in the present embodiment are not limited to those including stacked electrical storage units as illustrated in FIGS. 7 and 15. For example, the electrochemical device multilayer block 1 and the electric double layer capacitor 80A that include no stacked electrical storage units are also within the scope of the present invention.

The electrochemical device multilayer block 1 and the electric double layer capacitor 80A of this type can be manufactured by using only one positive-electrode negative-electrode integrated sheet 50A.

EXAMPLES

1. Examples 1 and 2 and Comparative Examples 1 and 2
Examples 1 and 2 correspond to the first embodiment.
(1) Method for Manufacturing Activated Carbon Electrode
(i) 29.0 g of activated carbon (BET specific surface area 1668 m2/g, average pore diameter 1.83 nm, average particle size D50=1.26 μm),
(ii) 2.7 g of carbon black (Tokablack (registered trademark) #3855 manufactured by Tokai Carbon Co., Ltd., BET specific surface area 90 m2/g),
(iii) 3.0 g of carboxymethylcellulose (CMC 2260 manufactured by Daicel Chemical Industries, Ltd.),
(iv) 2.0 g of 38.8% by weight aqueous solution of polyacrylate resin, and
(v) 286 g of deionized water
were weighed and mixed by first and second dispersion under conditions listed in Table 1 to prepare an activated carbon paste. The activated carbon paste was applied to one side of an aluminum foil (collector) having a thickness of 20 μm by screen printing to form an active material layer (activated carbon electrode) having a thickness of 5 μm.

TABLE 1

| First dispersion | Apparatus: Despa Mill (MD-3 manufactured by Asada Iron Works Co., Ltd.) Conditions: Volume 1 L, number of revolutions 6000 rpm, dispersion time 120 minutes |
|---|---|
| Second dispersion | Apparatus: Despa Mill (MD-3 manufactured by Asada Iron Works Co., Ltd.) Conditions: Volume 1 L, number of revolutions 14000 rpm, dispersion time 10 minutes |
| Coating | Apparatus: Screen printer Targe thickness 5 μm Drying temperature: 100° C. |

(2) Formation of First Insulating Layer
i) Preparation of Binder Solution
160 g of a poly(vinylidene fluoride)-hexafluoropropylene copolymer (PVDF-HFP) and 640 g of a NMP solvent in a 1-L pot was mixed in a pot rack. After mixing at a rotation speed of 150 rpm for 24 hours, a binder solution of 20% by mass PVDF-HFP in 1-methyl-2-pyrrolidone (NMP) was obtained.
ii) Preparation of First Insulating Layer Paste
First Preparation
A 500-mL pot was charged with 25 g of an alumina powder (D50=0.3 μm), 175 g of rounded stones (zirconia balls φ5 mm), and 25 g of a NMP solvent. The materials were crushed (at a rotation speed of 150 rpm for 16 hours) in a pot rack in first preparation.

Second Preparation 236 g of the binder solution was then added to the pot and was mixed in the pot rack (at a rotation speed of 150 rpm for 4 hours) to yield approximately 250 mL of an insulating layer slurry (first insulating layer paste).

The first insulating layer paste was applied to the active material layer to manufacture an electrode including a first insulating layer having a thickness of 3 µm as illustrated in FIG. 3(a).

In the electrode as illustrated in FIG. 3(a), the sides (in the x direction and in the y direction) of the columnar first insulating layers 42 have a length of 1 mm, and the distance between the first insulating layers 42 (that is, the width of a portion of the active material layer 21b not covered with the first insulating layers 42) is 0.95 mm in the transverse direction (in the y direction in FIG. 3(a)) and 1 mm in the longitudinal direction (in the x direction in FIG. 3(a)).

The electrode sheet thus formed was punched with a Thomson blade [N4Z235-0010 manufactured by Mitsuwa Frontech Corp.] to manufacture two electrodes.

The two electrodes were stacked such that the first insulating layers 42 faced each other and were bonded together by thermocompression bonding (150° C., 20 MPa, 30 seconds) to manufacture a layered body.

(3) Lamination and Supply of Electrolyte

An aluminum positive electrode tab 23a and an aluminum negative electrode tab 33a were welded to the layered body.

As illustrated in FIG. 1(a) (one electrical storage unit), the layered body was wrapped with an aluminum laminate film from both sides and was temporarily sealed with an impulse sealer to manufacture a cell.

A polypropylene film on the inside of the aluminum laminate film was heated to temporarily seal the layered body.

After three sides of the aluminum laminate film were temporarily sealed, 90 µL of an electrolyte 1-ethyl-3-methylimidazolium tetrafluoroborate was supplied to the layered body. Sealing portions including the final sealing portion were completely sealed with a vacuum sealer (manufactured by Furukawa Mfg. Co., Ltd.).

In this manner, an electric double layer capacitor according to Example 1 was manufactured.

In the same manner, electric double layer capacitors according to Example 2, Comparative Example 1, and Comparative Example 2 were manufactured.

A sample according to Example 2 was an electric double layer capacitor in which a porous second insulating layer (having a thickness of 3 µm) was formed by printing on a portion of the active material layer in Example 1 that was not covered with the first insulating layer.

The second insulating layer (separator layer) was formed as described below.

First Preparation

A 500-mL pot was charged with 100 g of an alumina powder (D50=0.3 µm), 700 g of rounded stones (zirconia balls φ5 mm), and 80 g of a NMP solvent. The materials were crushed (at a rotation speed of 150 rpm for 16 hours) in a pot rack in first preparation.

Second Preparation 68 g of the binder solution used in Example 1 was added to the pot and was mixed in a pot rack (at a rotation speed of 150 rpm for 4 hours) to yield approximately 100 mL of a porous insulating layer slurry (second insulating layer paste).

The second insulating layer paste was applied to form a second insulating layer having a thickness of 3 µm.

A sample according to Comparative Example 1 was an electric double layer capacitor in which a second insulating layer (having a thickness of 3 µm) was formed over the entire surface of the active material layer 21b in the electrode illustrated in FIG. 3(a).

A sample according to Comparative Example 2 was an electric double layer capacitor in which a first insulating layer 42 (having a thickness of 3 µm) was formed over the entire surface of the active material layer 21b in the electrode illustrated in FIG. 3(a).

The sample according to Comparative Example 1 could not maintain the shape of the layered body because the second insulating layer was not adhesive. Thus, an electric double layer capacitor that included a positive electrode and a negative electrode bonded together could not be manufactured.

The electric double layer capacitors that included the positive electrode and the negative electrode bonded together according to Example 1, Example 2, and Comparative Example 2 were subjected to measurements of the capacitance (CAP), electrical resistance (ESR), and leakage current.

Figure 16:
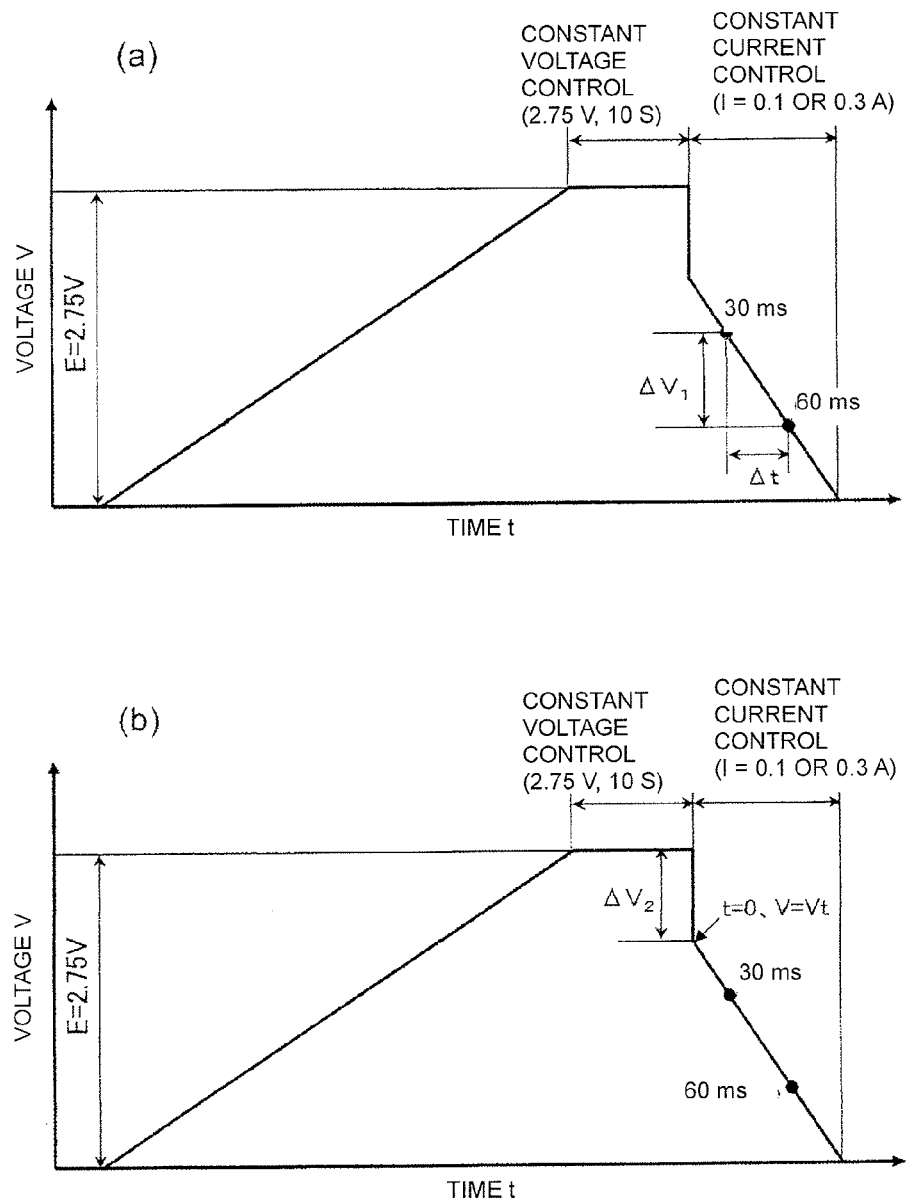
FIG. 16(a) is a schematic view of a capacitance (CAP) measurement method.
FIG. 16(b) is a schematic view of an electrical resistance (ESR) measurement method.

FIG. 16(a) is a schematic view of a capacitance (CAP) measurement method. FIG. 16(b) is a schematic view of an electrical resistance (ESR) measurement method.

The capacitance (CAP) of the electric double layer capacitors was measured as described below.

The electric double layer capacitors were charged to 2.75 V at a constant current of 100 mA and were maintained at 2.75 V for 10 seconds. The electric double layer capacitors then discharged at a constant current of 100 mA. The relationship between voltage (V) and time (t) was measured during the constant-current discharge. From the linear approximation of the relationship between voltage (V) and time (t) in the range of 30 to 60 ms after the start of discharge, the inclination of the approximate straight line $\Delta V1/\Delta t$ (negative value) was determined. The capacitance (CAP) was calculated using the following equation (1).

$$CAP = -I \cdot \Delta t / \Delta V1 \qquad (1)$$

The electrical resistance (ESR) of the electric double layer capacitors was measured as described below.

The electric double layer capacitors were charged to 2.75 V at a constant current of 100 mA and were maintained at 2.75 V for 10 seconds. The electric double layer capacitors then discharged at a constant current of 100 mA. As illustrated in FIG. 16(b), the voltage sharply decreased from 2.75 V by $\Delta V2$ immediately after the start of discharge because of the effects of the electrical resistance (ESR).

$\Delta V2$ was determined as described below.

The relationship between voltage (V) and time (t) was measured during the constant-current discharge. The relationship between voltage (V) and time (t) in the range of 30 to 60 ms after the start of discharge was determined by linear approximation.

The voltage Vt immediately after the start of discharge, that is, at t=0 was determined from the approximate straight line.

$\Delta V2$ was calculated using the following equation (2).

$$\Delta V2 = 2.75 - Vt \qquad (2)$$

After determination of $\Delta V2$ in this manner, ESR was calculated using the following equation (3).

$$ESR = \Delta V2 / I \qquad (3)$$

The leakage current of each of the electric double layer capacitors was measured as described below.

The electric double layer capacitors were charged to 2.75 V at a constant current of 100 mA and were maintained at 2.75 V for 300 seconds. Since the voltage decreases because of leakage current, charging must be continued to maintain the constant voltage. The electric current I for maintaining the constant voltage corresponds to the leakage current.

The electric current I after holding for 300 seconds was considered to be the leakage current.

Table 2 lists the measurement results of capacitance, electrical resistance, and leakage current.

TABLE 2

|  | Capacitance (mF) | Resistance (mΩ) | Leakage current (μA) |
| --- | --- | --- | --- |
| Example 1 | 94 | 198 | 54 |
| Example 2 | 93 | 245 | 39 |
| Comparative example 2 | Unmeasurable | Unmeasurable | 36 |

Because of its excessively high resistance under the discharge conditions described above, Comparative Example 2 had an unmeasurable low voltage 30 ms after the start of discharge. Thus, the capacitance and resistance of Comparative Example 2 could not be measured.

The electrical storage devices according to Examples 1 and 2 that could be reduced in size and height had a higher capacitance than Comparative Example 2 (the capacitance of Comparative Example 2 was too small to measure). Example 1 had a particularly low resistance. The electric double layer capacitor according to Example 2 had a higher resistance but a lower leakage current than the electric double layer capacitor according to Example 1.

2. Examples 3 and 4

Examples 3 and 4 correspond to the second embodiment.

Example 3

In Example 3, an electric double layer capacitor block (electrochemical device multilayer block 1) was manufactured using the manufacturing method according to Embodiment 2.

A substrate PET film on which a silicone mold-releasing layer 101 was disposed was prepared as the substrate film 100.

An aluminum film having a thickness of 500 nm was formed by vacuum evaporation on the substrate PET film 100 as the positive-electrode collector film 102.

The deposition conditions for the aluminum film included a degree of vacuum of 3×10-4 Pa, an electric current of 800 mA, a film deposition rate of 30 angstroms/second, and a substrate cooling temperature of −10° C.

Resist patterns R102 including 5 columns and 10 rows of 20 mm×10 mm rectangular layers arranged at intervals of 8 mm were printed by screen printing on the substrate PET film 100 having the aluminum film 102 and were dried in an air-heating furnace at 100° C. for 15 minutes.

The substrate PET film 100 having the resist patterns R102 was immersed in an aqueous iron (III) chloride bath at 45° C. for 30 seconds to remove a portion of the aluminum film not masked with the resist by wet etching. Thus, a positive-electrode collector aluminum electrode was formed as the positive-electrode collector electrode 21a. Aqueous iron (III) chloride remaining on the substrate surface was washed with water.

Although inexpensive iron (III) chloride was used in Example 3, hydrochloric acid, sulfuric acid, nitric acid, or a mixture thereof, or a neutral aqueous solution of a hydrofluoric acid salt may be used.

The substrate PET film 100 having the positive-electrode collector electrode 21a (aluminum electrode) was passed through a butyl acetate shower to remove the resist. Butyl acetate remaining on the substrate surface was then evaporated in an air-heating furnace at 60° C.

In addition to butyl acetate, other organic solvents, such as propylene glycol monomethyl ether acetate, 3-methoxybutyl acetate, and amine solvents can be used to remove the resist.

Active Material Layer

An activated carbon paste was prepared in the same manner as in Example 1.

The activated carbon paste was applied by screen printing to a 20 mm×10 mm rectangular positive-electrode collector electrode (aluminum electrode) to form two 6 mm×10 mm rectangular active material layers as illustrated in FIG. 9(6a). The rectangular active material layers were dried in an air-heating furnace at 80° C. for 20 minutes to form the positive-electrode active material layers 21b having a thickness of 4 μm.

Formation of First Insulating Layer

Approximately 250 mL of an insulating layer slurry (first insulating layer paste) was prepared in the same manner as in Example 1.

Fifty positive-electrode composite sheets 20A (without the separator layer 14) illustrated in FIGS. 10(7a) and 10(7b) were prepared with the first insulating layer paste. The first insulating layers 42 had a thickness of 15 μm (the distance from the top of the mold-releasing layer 101 to the top of the first insulating layers 42).

Fifty negative-electrode composite sheets 30A were prepared in the same manner.

The positive-electrode composite sheet 20A disposed on the negative-electrode composite sheet 30A such that the first insulating layers 42 faced each other were bonded together while being uniformly pressed from both sides using pressure plates. The pressure plates were pressed at a temperature of 150° C. at a pressure of 20 MPa for 30 seconds.

Additional 49 positive-electrode negative-electrode integrated sheets were prepared as the positive-electrode negative-electrode integrated sheets 50A.

As described below, the positive-electrode negative-electrode integrated sheets 50A were stacked while the substrate PET film 100 was removed.

A positive-electrode negative-electrode integrated sheet 50A was lifted with a sucker disposed on the negative electrode, and the substrate PET film 100 was removed from the positive electrode.

The positive-electrode negative-electrode integrated sheet 50A lifted with the sucker from which the substrate PET film 100 on the positive electrode side was removed was then placed on and bonded to a sheet that included only the first insulating layers 42 having a thickness of 8 μm formed on the substrate PET film 100 such that the substrate PET film 100 faced downward.

The substrate PET film 100 of the positive-electrode negative-electrode integrated sheet 50A lifted with the sucker was then removed from the negative electrode.

Another positive-electrode negative-electrode integrated sheet 50A was then lifted with a sucker disposed on the positive electrode, and the substrate PET film 100 was removed from the negative electrode.

That other positive-electrode negative-electrode integrated sheet 50A from which the substrate PET film 100 on the negative electrode side was removed was then placed on and bonded to the positive-electrode negative-electrode integrated sheet 50 to which the sheet including only the first insulating layers 42 formed on the substrate PET film 100 was bonded. After bonding, the substrate PET film 100 of that other positive-electrode negative-electrode integrated sheet 50A was removed from the positive electrode.

That other positive-electrode negative-electrode integrated sheet 50A from which the substrate PET film 100 on the positive electrode side was removed was then placed under and bonded to still another positive-electrode negative-electrode integrated sheet 50A from which the substrate PET film 100 on the positive electrode side was removed while a sucker was disposed on the negative electrode.

These processes were repeatedly performed to stack 50 positive-electrode negative-electrode integrated sheets 50A on the sheet including only the first insulating layers 42 on the substrate PET film 100, and the top substrate PET film 100 was removed.

Finally, while a sucker was disposed on the substrate PET film 100 of another sheet including only the first insulating layers 42 on the substrate PET film 100, the first insulating layers 42 was bonded to the positive-electrode negative-electrode integrated sheets 50A from which the top substrate PET film 100 was removed, thereby forming an electrochemical device multilayer sheet.

The bonding described above was performed while the first insulating layers 42 and the positive-electrode negative-electrode integrated sheet 50A on the substrate PET film 100 or two positive-electrode negative-electrode integrated sheets 50A were brought into contact with each other with the entire surfaces thereof being uniformly pressed using pressure plates.

The pressure plates were pressed at a temperature of 150° C. at a pressure of 20 MPa for 30 seconds.

The substrate PET film 100 was then removed from the top and bottom of the electrochemical device multilayer sheet LB1 thus formed. The electrochemical device multilayer sheet LB1 was then cut into an electric double layer capacitor block (electrochemical device multilayer block) 1.

Aluminum was then deposited by sputtering on the side surfaces of the electric double layer capacitor block 1 to form the positive-electrode terminal electrode 21t and the negative-electrode terminal electrode 31t.

As illustrated in FIG. 15, the electric double layer capacitor block 1 was then housed in a liquid crystal polymer package that included the package base 11b, which included the positive-electrode package electrode 22b and the negative-electrode package electrode 32b, and the package lid 11a. The electrically conductive adhesive 22a and the electrically conductive adhesive 32a each containing gold as electrically conductive particles were applied by dipping to the positive-electrode terminal electrode 21t and the negative-electrode terminal electrode 31t, respectively. The electrochemical device multilayer block 1 was placed in the package such that the electrically conductive adhesive 22a and the electrically conductive adhesive 32a were connected to the positive-electrode package electrode 22b and the negative-electrode package electrode 32b, respectively.

The electrically conductive adhesives were cured at 170° C. for 10 minutes. Thus, the electric double layer capacitor block 1 was fixed to the package electrodes, and the terminal electrodes were electrically connected to the package electrodes.

After the electric double layer capacitor block 1 was fixed in and electrically connected to the package, 90 μL of an electrolyte 1-ethyl-3-methylimidazolium tetrafluoroborate was supplied, and the package was sealed by laser welding.

An electric double layer capacitor according to Example 3 was thus completed.

Example 4

Approximately 100 mL of a porous insulating layer slurry (second insulating layer paste) was prepared in the same manner as in Example 2.

An electric double layer capacitor was manufactured in the same manner as in Example 3 except that the second insulating layer paste was applied to the entire surfaces of the positive-electrode active material layer 21b and the negative-electrode active material layer 31b to form the porous second insulating layers 14 in the formation of the positive-electrode composite sheet 20A and the negative-electrode composite sheet 30A.

Capacitance and Electrical Resistance

The capacitance and electrical resistance of the electric double layer capacitors according to Examples 3 and 4 were measured using the same method as Example 1. The charge and discharge currents were 3 A.

The electric double layer capacitor according to Example 3 had a capacitance of 476 mF and an electrical resistance of 18 mΩ.

The electric double layer capacitor according to Example 4 had a capacitance of 402 mF and an electrical resistance of 28 mΩ.

These examples show that small, low-profile, low-resistance, and high-capacity electrical storage devices can be provided. The electrical storage device according to Example 3 had a particularly low resistance.

REFERENCE SIGNS LIST 1 electrochemical device multilayer block
11a package lid
11b package base
14 separator layer
20A positive-electrode composite sheet
21a positive-electrode collector electrode
21b positive-electrode active material layer
21t positive-electrode terminal electrode
22a, 32a electrically conductive adhesive
22b positive-electrode package electrode
25 slit
30A negative-electrode composite sheet
31a negative-electrode collector electrode
31b negative-electrode active material layer
31t negative-electrode terminal electrode
32b negative-electrode package electrode
42 first insulating layer
50A positive-electrode negative-electrode integrated sheet
60 electrical storage unit
80, 80A electric double layer capacitor
100 substrate film
101 mold-releasing layer
102 positive-electrode collector film
R102 resist pattern
LB1 electrochemical device multilayer sheet
D1 cut line

The invention claimed is:

1. An electrical storage device, comprising:
a positive electrode including a positive-electrode collector electrode and a positive-electrode active material layer disposed on the positive-electrode collector electrode;

a negative electrode including a negative-electrode collector electrode and a negative-electrode active material layer disposed on the negative-electrode collector electrode such that the negative-electrode active material layer faces the positive-electrode active material layer; and a first insulating layer comprising a plurality of columns extending between the positive electrode and the negative electrode to insulate the positive electrode from the negative electrode, wherein the plurality of columns of the first insulating layer define a plurality of paths that extend around the plurality of columns and between a surface of the positive electrode and a surface of the negative electrode.

2. The electrical storage device according to claim 1, wherein the plurality of paths provide communication paths between the surfaces of the positive and negative electrodes and the outside of the electrical storage device.

3. The electrical storage device according to claim 1, wherein each of the plurality of paths has a width of at least 50 μm and at most 100 mm.

4. The electrical storage device according to claim 1, wherein the first insulating layer comprises a particulate insulator.

5. The electrical storage device according to claim 1, further comprising a porous second insulating layer surrounded by the positive electrode, the negative electrode, and the first insulating layer.

6. The electrical storage device according to claim 5, wherein the second insulating layer has a lower air permeability than the first insulating layer.

7. The electrical storage device according to claim 1, further comprising an electrolyte disposed in the plurality of paths.

8. The electrical storage device according to claim 1, wherein the columns of the first insulating layer define a grid-like pattern that defines the plurality of paths interconnected to each other.

9. The electrical storage device according to claim 1,
wherein the first insulating layer is bonded to three sides of the positive-electrode active material layer and the negative-electrode active material layer, and
wherein at least one path of the plurality of paths is disposed at a fourth side of the positive-electrode active material layer and the negative-electrode active material layer.

10. The electrical storage device according to claim 1, wherein the first insulating layer comprises a pair of insulating layers disposed on respective sides of the positive-electrode active material layer and the negative-electrode active material layer.

11. The electrical storage device according to claim 1, wherein the first insulating layer is bonded to side surfaces of the positive-electrode active material layer and the negative-electrode active material layer.

* * * * *